United States Patent

Maloney

[11] Patent Number: 6,127,975
[45] Date of Patent: Oct. 3, 2000

[54] SINGLE STATION COMMUNICATIONS LOCALIZATION SYSTEM

[75] Inventor: John E. Maloney, Springfield, Va.

[73] Assignee: KSI, Incorporated, Annandale, Va.

[21] Appl. No.: 09/031,057

[22] Filed: Feb. 26, 1998

Related U.S. Application Data

[63] Continuation of application No. 08/335,331, Nov. 3, 1994, Pat. No. 5,959,580.

[51] Int. Cl.$^7$ ........................................................ G01S 3/02
[52] U.S. Cl. ............................................. 342/457; 701/207
[58] Field of Search ....................................... 342/417, 457, 342/357.01, 357.06; 701/207, 213, 220

[56] References Cited

U.S. PATENT DOCUMENTS 4,728,959  3/1988  Maloney et al. .
5,003,317  3/1991  Gray et al. ................................. 342/457
5,045,860  9/1991  Hodson ..................................... 342/451
5,465,289  11/1995  Kennedy ..................................... 379/59
5,959,580  9/1999  Maloney et al. .......................... 342/457

FOREIGN PATENT DOCUMENTS 9714257  4/1997  WIPO .

*Primary Examiner*—Thomas H. Tarcza
*Assistant Examiner*—Dao L. Phan
*Attorney, Agent, or Firm*—Sterne, Kessler, Goldstein & Fox P.L.L.C

[57] ABSTRACT

The present invention combines the measured characteristics of a radio signal in a communications environment with collateral information to produce an accurate and economical way to locate a mobile transmitter station, such as a mobile telephone, in a cellular telephone network.

4 Claims, 9 Drawing Sheets

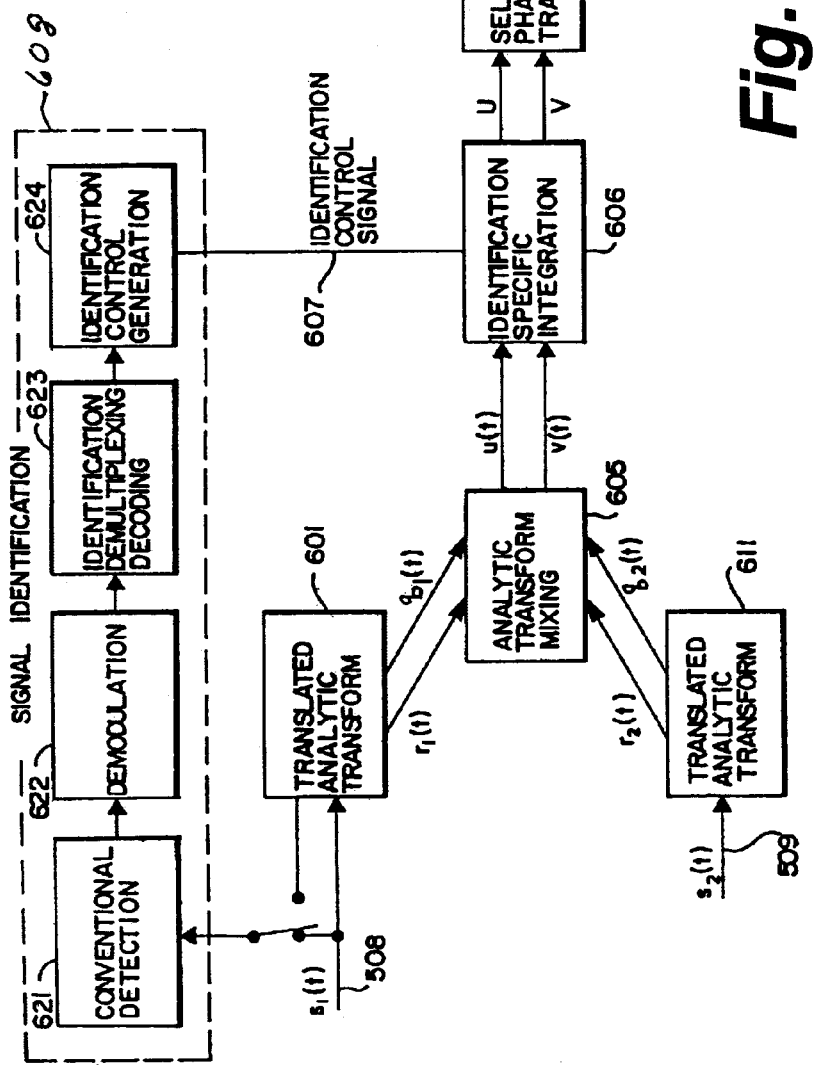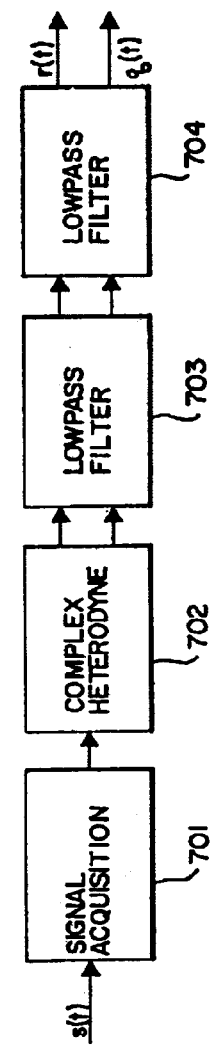

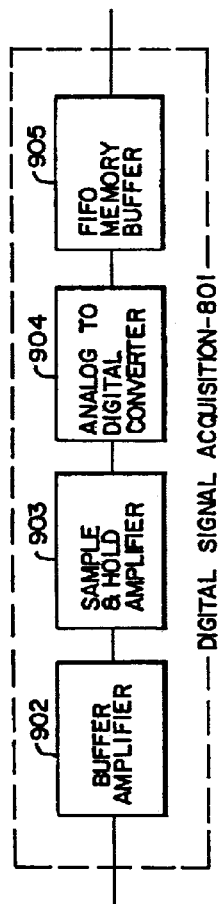

SINGLE STATION COMMUNICATIONS LOCALIZATION SYSTEM

RELATED APPLICATION

The present application is a continuation of U.S. patent application Ser. No. 08/335,331, filed Nov. 3, 1994 now U.S. Pat. No. 5,959,580, and claims the benefit of its filing date under 35 U.S.C. §120.

BACKGROUND AND SUMMARY OF THE INVENTION

The present invention relates to a method and apparatus for determining the location of a mobile radio transmitter, especially a mobile radio transmitter positioned in the service area of a cellular communications telephone system.

Cellular telephone systems now provide ready access to wireless telephone communications. Present cellular telephones operate in an analog system of frequency division multiple access (FDMA). Digital technologies, including time division multiple access (TDMA) or code division multiple access (CDMA), offer greater capacity and should give more individuals simultaneous access to cellular telephone services. In addition, cellular-like communications systems, such as personal communication systems (PCSs), will further increase the number of individuals with access to a wireless communication network.

A cellular-telephone or cell-like communication system involves a network of fixed base stations that provide an integrated communication service to a plurality of mobile transmitter/receiver ("transceiver") units, e.g., cellular telephones. The communications network attempts to communicate with each transceiver from the base station which provides the optimal communication. The optimal base station is usually, but not necessarily, the one nearest the mobile transceiver. To provide the optimal communications support, the network need not locate the geographic position of the mobile transceiver more accurately than needed to determine which base station to use.

The inability of existing communication networks for cellular-telephone or cell-like communication systems to accurately determine the location of a mobile transmitter is a major disadvantage in an emergency. For example, public safety officials in Los Angeles estimate that, today, a quarter of all who call the emergency number ("9-1-1") from a cellular telephone do not know where they are when they call. The time spent in finding their location delays emergency assistance units, for example, police or ambulance services, in providing assistance. Other studies indicate that in excess of sixty percent of traffic fatalities in the United States occur on rural roadways. Delays caused by uncertainty in location also exacerbate the inherently longer response times for providing emergency services in rural areas.

Monitoring mobile transceivers that are located on vehicles has advantages other than providing support for responses to requests for assistance. One such advantage is enabling the cost effective monitoring of traffic flow. Unplanned traffic incidents ("traffic jams") clog the highways with a resulting deleterious effects on safety, environment, and economy. The volume of message traffic in a major metropolitan area is a type of collateral information, and it can be combined with observed location- and speed-related information and topographic information (e.g., road maps), to indicate which roads are passable and which are congested. However, traffic flow information, emergency services, and roadside assistance are not primary reasons for establishing a communication system and thus are not currently provided by the system. The cost of adding equipment to the communications infrastructure to provide such information and services seems justifiable to communications companies only if it can be done using the most modest of infrastructure enhancements.

The problem of locating the position of a mobile radio transceiver has been solved in many ways for many years but in systems other than that of a cellular-telephone or cell-like communication system. No simple, low-cost solution has been found that is practical when applied to the wide-scale monitoring of mobile telephones. One practical difficulty in implementing any type of localization for mobile radio transceivers is the cost of the modifications either to the transceiver or to the communications network (infrastructure) that are needed to determine the location of the mobile transceiver. Any given transceiver would rarely, if ever, be used in placing a request for emergency or roadside assistance. Thus, the suppliers of transceivers and the operators of communications networks have little economic incentive to increase the complexity (and cost) of the transceivers or to install an extensive and expensive infrastructure to support such rarely used services absent government mandate. However unprofitable in the short term, emergency assistance and roadside assistance services have unquestionable value for providing and enhancing personal and public safety. Ameliorating the increasing incidence of violence and the related, growing concern for personal security with a mobile communications system is a worthy policy goal with the potential for realizing enormous benefit to subscribers, network operators, and the general public alike. However, realizing the objective, even one so important and valuable, requires a practical, inexpensive infrastructure for uniquely identifying people requesting or reporting the need for assistance, communicating with them, and providing their locations to a responding assistant.

Today, techniques exist that provide partial and complex solutions to the problem of providing geographical locations with sufficient accuracy to aid emergency and roadside assistance personnel. For example, a radio transmitter may typically be attached to a vehicle which would enable the vehicle to be localized for purposes of protecting endangered cargo or persons, controlling the deployment of delivery trucks in an urban area or any other of a number of applications.

Several localization systems are presently commercially available. Some of the systems use navigational instruments such as ring laser devices. Others use magnetic field sensors that are sensitive to the earth's magnetic field. Yet another type uses radio beacons such as the LORAN-C system. While the systems perform satisfactorily, they are not suited for consumer use due to their inherent complexity and cost as well as the need for frequent reinitialization or calibration.

Techniques exist for accurately determining one's position in applications other than that of providing emergency or roadside assistance. For example, the satellite-based Global Positioning System (GPS) allows determination of the location of the point of GPS signal reception with a special-purpose receiver for the wireless GPS signals that are broadcast from the satellites. However, obtaining the position of a communications transceiver by using GPS requires the mobile transceiver to include a GPS receiver. GPS receivers are expensive. Even if their cost were to be reduced through mass production, GPS receivers would still have to be integrated with all existing and future mobile transceivers. The cost associated with this solution seems to be prohibitive in view of the in frequency of use of the service and especially in terms of the large number of mobile transceivers for which the localization capability is desired.

Further, present satellite communication systems provide coverage only for large geographic areas. Even if the GPS system does become operational, no satellite system will exist that can record the position of large number of terrestrial vehicles in a small geographic areas such as a city. While proposals have been made to orbit communications satellites that can service small geographic areas, no satellite system presently scheduled for launch in at least the next decade would permit reusing radio frequency channels. Thus, any satellite-based vehicle localization system would be inefficient in utilizing limited radio frequency space.

Several attempts have been made over time to use terrestrial-based radio direction finding and positioning systems. One type of radio positioning system measures the time required for a radio signal to travel between a mobile transmitter station and fixed antenna locations. Time difference measurements are obtained by comparing the wide band signal wave forms transmitted from the mobile station with some form of pulsed amplitude modulation or specific coding modulation so that the timing resolution and related position resolution is proportional to the inverse of the signal bandwidth. Yet another radio positioning system uses time difference measurements obtained by comparing narrow band signal wave forms to obtain a difference in the phase of the received signal. The radio frequency signals have a wavelength comparable to the separation of the antenna sites and the ability to resolve the location of the mobile transmitter station is proportional to the wavelength of the signal. Either radio positioning system, however, requires synchronizing separated antenna sites. The synchronization requirement may be overcome by adding a special, known wave form to the radio signal. The waveforms received at each receiver, however, must be compared to determine the position of the mobile transmitter station. The common waveforms must not be distorted by any intervening interference.

A simpler method of determining the location of mobile radio transmitter station involves passively monitoring its radio emissions, measuring the angle of arrival of a radio signal at a number of fixed locations, and then determining the area in which all the direction angles cross. One way to determine the direction angle is to electronically compare the difference in phase of the radio signal that is received by different antenna elements at a receiver site. Positioning the two antenna elements approximately ½ wavelength apart produces a narrow band intersignal phase difference which is proportional to the sine of the angle at which the signal is received.

However, with the simplest of approaches, radio localization does not take into consideration the distortions in apparent location caused by multipath interference (multipathing). Since most vehicles operate in an urban setting, it is highly desirable that any vehicle location system operate in an urban environment. A moving vehicle in an urban environment, however, seldom has a direct line-of-sight path to a receiver station. Rather, the propagation path contains many obstacles in the form of buildings and other structures, hill, and other vehicles which may be either landborne or airborne. Multipathing involves radio signals bouncing off of objects such as vehicles, buildings, hillsides, etc. The absence of a unique propagation path between the vehicle and the receiver station causes the instantaneous signal strength of any radio signal emitted from the vehicle to be highly variable at the receiver station. Indeed, it is known that the main propagation features of a radio signal in an urban environment are produced by multipath interference and shadowing of the direct line of sight path by intervening features of the terrain.

Multipath interference typically corresponds to so called Rayleigh signal fades. The signal fades occur because of plane wave interference and are separated by a ground distance of approximately one half wavelength apart. Multipath interference produces irregularly varying patterns of radio transmitter station moves through the service area which causes the radio frequency signal to fluctuate in exact position of any maxima or minima also depends on the wavelength of the radio frequency signal. Data which is transmitted during a deep fade typically is lost. Thus, multipath interference produces a complicated pattern of signal distortion which is an inherent characteristic of RF transmissions in an urban environment.

Without consideration of these effects, the apparent position of the transceiver will be distorted. Multipath propagation is common for short-wavelength, radio communications since relatively smaller objects can reflect substantial amounts of the transmitted signals, and it is especially common in cities with buildings reflecting the signals. The potential multipath-induced distortions in the apparent position of the mobile transceiver are therefore a problem that must be addressed in passively localizing radio emitters to support applications such as the provision of emergency or roadside assistance.

Multipath propagation conditions need not impede locating a transceiver when signal analysis and source localization procedures are used to ameliorate potential distortions in apparent position. For example, U.S. Pat. No. 4,728,959 to Maloney et al. demonstrates how direction finding procedures, by which the direction of the arrival of a signal can be estimated, can be applied with two or more receiving base stations.

The invention disclosed by Maloney et al. combines the relative insensitivity of the phase angle differences of a radio signal to the signal distortions inherent in an urban environment with digital signal processing techniques to produce and accurate and economical way to locate a mobile transmitter station such as a mobile telephone in a cellular telephone network. Phase angle measurements indicative of the angle of direction of a mobile transmitter station from each of a plurality of land stations are obtained by translated Hilbert transformation and are processed to produce a probability density function. The probability density functions are combined after a CHI-squared analysis to produce an area of uncertainty representing the position of the mobile transmitter station. The radio frequency signals emitted from the mobile transmitter station need have no special characteristics for the localization process. Thus, the invention disclosed by Maloney et al. may easily work as an adjunct to an unrelated communications system such as a cellular telephone system.

In the preferred embodiment of the invention disclosed by Maloney et al., a transmission from the mobile transmitter station is received by at least two land stations. Receivers at at least two antenna elements identify the signal as coming from the target mobile transmitter station and reduce the frequency of the signal to correspond to the processing speed of digital signal processing circuitry. Processing units at the land stations determine complex phasor relationships between the antenna elements that represent the conjugate product of the signals in the two antenna elements corresponding to the phase of the radio signals in each antenna element and the direction angle to the mobile transmitter station from the land station. The phasor relationship is dependent on the amplitude of the recorded signal and weighted by a predetermined threshold so that the phasor is integrated with time to form a dynamically determined probability density function. The wavelengths of the signals preferably are short enough, e.g. HF, VHF and UHF, so that the antenna elements are closely spaced at common land station and each element receives a signal of common phase evolution. The measured direction angles from at least two, and preferably more, land stations are combined at a control land station to determine the position of the mobile transmitter station.

The control land station applies a non-linear least-squares analysis to the raw data. Rather than selecting two or more "best" direction angle measurements to determine location, the present invention analyzes all available direction angle measurements for temporal and internal statistical, or CHI-squared, consistency so as to mitigate multipath interference in the direction angle. The control land station generates an areas of uncertainty from the density functions associated with the direction angle measurements.

For a radio frequency system having a limited range of frequencies, both frequency division multiplexing and time division multiplexing are used to accommodate a number of mobile transmitter stations. The mobile transmitter station emits a signal which need have no special characteristic.

It is known that shadowing and multipath interference does not distort the frequency or the phase of a radio frequency signal as much as its amplitude and travel time. Thus, the relative insensitivity of frequency modulation to multipath interference has encouraged its use in cellular telephone systems which operate in, for example, the 800–900 MHz frequency bands. Shadowing and multipath interference nevertheless cause the apparent position of the mobile radio transmitter to randomly change with time so as to severely limit the accuracy and, hence, the applicability of the above mentioned phase difference technique of radio position locating to solving the problem of localizing a large number of vehicles in an urban environment. The invention disclosed by Maloney et al. is thus well adapted to operate as an adjunct to existing cellular communications systems of a type that are presently serving most urban areas.

Using the passive monitoring of communication signals that is described by Maloney et al. to determine location is an excellent application in that it allows for locating a mobile transceiver anywhere in a service area of a network having at least two receiving stations of known location. The direction finding approach is simpler, more accurate, and less costly than other approaches. However, the necessity of requiring joint reception of a common signal at multiple sites can increase the complexity and cost of this approach beyond what some cellular telephone or PCS companies are currently or may be willing to accept.

The systems described above rely on observed information derived from multiple, joint receptions of radio emissions, or on navigation information from devices extraneous to the communications transceiver. No system seeks to obtain location information from the combination of observed directional information, derived from communications radio receptions, with collateral information obtained, for example, from street maps. Therefore, it is an object of the present invention to provide a simple and effective way to identify and locate a mobile radio transceiver in any wireless communication system, including those already existing or that are contemplated, such as those for personal communication systems (PCSs), cellular telephones, specialized mobile radios (SMRs), and personal digital assistants (PDAs). It is an object of the present invention to provide an automatic location identification (ALI) and an automatic "number" identification (ANI) that facilitates national and international rural and urban emergency notification and personal security, and roadway monitoring by combining observed information derived from received radio emissions with collateral information derived from street maps, user descriptions, and other information sources.

The objectives of the present invention also include: providing a system in which location and identification are provided cheaply as adjuncts to communications for national and international wireless enhanced 9-1-1 (E 9-1-1) emergency and routine roadside assistance notification; estimating roadway speed and providing general transportation information such as traffic congestion and flow characterization; providing such capability in a system which is both relatively easy to deploy and inexpensive to construct; providing a system which has a transportable configuration and, therefore, can be used to temporarily monitor localized regions such as road construction areas or the localities of special events such as sporting competitions, conventions, or concerts; and providing a combination of processes and attributes to form an inexpensive yet robust system for localization and identification as an adjunct to a communications system.

Often, in addition to directional data that can be derived from received signal characteristics, other information is available or can be obtained that relates to the position of a mobile radio transceiver. For example, in a system designed to provide emergency roadside assistance, we may presume that the person requesting assistance is in a vehicle that is on or near a road. Such a presumption may be verified, for example, by asking the person placing the call if he or she is on a road. This type of additional geographic or topological information, called here "collateral information", is of a type that is normally available to a dispatcher. Combining collateral information with the directional information from even a single base station can define the location of a mobile radio transceiver well enough to make it possible to dispatch emergency and roadside assistance services. The derivation of the position of the transceiver solely from observed characteristics of its radio emissions received at multiple sites is not necessary, and the need for additional base stations thus becomes redundant. However, no proposal to date has sought to use such collateral information to make redundant the need for additional base stations.

The present invention provides an apparatus for locating a mobile radio communications transceiver in a wireless communications system that comprises a sensor station of substantially known location, the sensor station having a directionally sensitive receiving antenna to receive a radio signal from the mobile transceiver, a signal characterization processing unit for determining a directional line of bearing from the sensor station to the mobile radio transceiver from the radio signal, a source of collateral information about the mobile transceiver, a multidimensional parametric correlation processing unit for determining a probable position of the mobile transceiver from the line of bearing information and the collateral information, and an output indicative of the probable position of the mobile transceiver.

The present invention provides for locating a mobile radio transceiver in a cellular-telephone or cell-like communications system using a simplified system for passively monitoring signals emitted by the mobile transceiver. In this invention, the processing at a single receiving base station of known location determines a line of bearing (i.e., a direction angle from the receiving site) to the mobile transceiver location. This line of bearing is then combined with collateral information to determine the likely location of the transceiver. The present invention has particular applicability to roadway transportation in that it facilitates emergency (9-1-1) services and roadside assistance, and it permits the passive monitoring of traffic flow. The collateral information includes location information derived from other than radio location methods. Such information can include the topological information of a map of the roadways in the area of the base station, or other information such as derived speed, if any, of the transceiver, or information obtained from communications from the caller in person or from equipment at the caller's location.

The present invention does not require determining position by crossfixing a position using lines of bearing from two or more base stations; a single base station can be enough. This capability may have particular usefulness in a CDMA communications network in which increased capacity is obtained through dynamic power control so that only one base station is intended to receive a transceiver's emissions. Nevertheless, there is nothing in the present invention that precludes using more than one base station to further confirm the accuracy of a location or to permit locating mobile radio transceivers for which collateral information is not otherwise available. The ability to determine location from a single site has particular benefit for providing emergency assistance in that single site reception is applicable in more environments, requires less infrastructure, and offers greatly reduced cost. The present invention is particularly useful for monitoring traffic in rural areas that have fewer roads such that collateral information in the form of roadway topology better indicates the exact location of the mobile transceiver along the observed line of bearing. The present invention also provides a method and apparatus for locating a mobile radio transceiver in a wireless communications system, comprising a sensor station of substantially known location, a method and means for determining a line of bearing from the sensor station to the mobile radio communications transceiver, and a method and means for combining collateral information with the line of bearing to determine the location of the mobile radio transceiver.

The present invention has the advantage of being able to determine the location of a mobile radio transceiver without requiring embedding or integrating a special purpose device, such as a GPS receiver, with the mobile transceiver. Indeed, the present invention enables the localization of all existing cellular telephones. The cost of deploying a location system of the present invention is low. This low start up cost means that the system can be deployed faster so that consumers can realize the benefits sooner and at less expense.

BRIEF DESCRIPTION OF THE DRAWINGS

FIG. 11 is a flow chart of a digital receiver for processing the phase angle measurements obtained from the receiver of FIG. 10;

FIG. 12 is a more detailed flow chart of the translated analytic transform block of FIG. 11;

FIG. 13 is a block diagram of a system for implementing the signal processing functions of the digital receiver shown in FIGS. 11 and 12; and FIG. 14 is a detailed block diagram of the digital signal acquisition block shown in FIG. 13.

DETAILED DESCRIPTION

Figure 1:
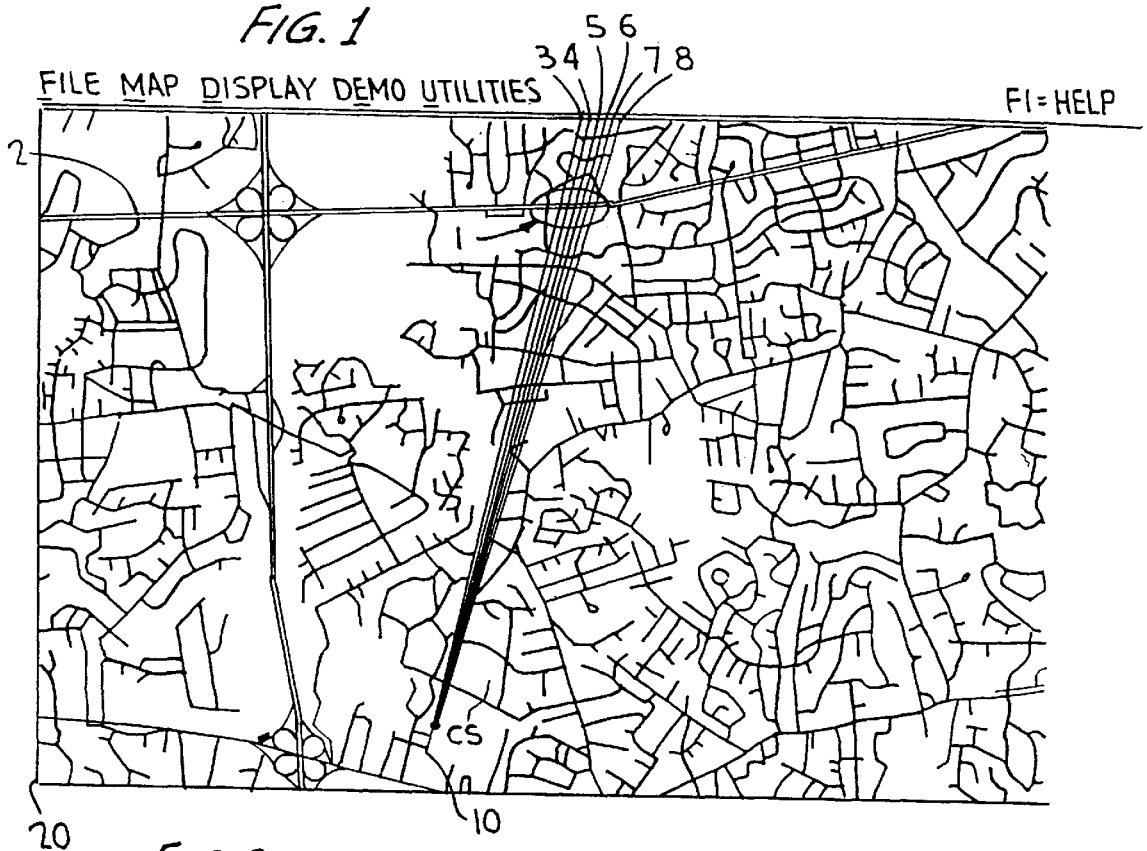
FIG. 1 illustrates the locations of a cellular telephone transceiver that can be obtained through the present invention by the correlation of directional information with the road location information inherent in a road network map.

FIG. 1 shows how the present invention can determine the location of a mobile transceiver. FIG. 1 shows collateral information in the form of a street map of a portion of Annandale, Va., in the United States, and a mobile radio transceiver in the form of a cellular telephone. A vehicle having the cellular telephone is in the localization area labeled 1 along a highway 2 (Virginia (Va.) Route 50). A directional antenna located at the sensor station 10 determines a series of lines of bearing 3-8 at different times.

The lines of bearing 3-8 are overlaid on the topological data 20 that represents the street map of the area. The data for these digitalized maps of urban areas are readily available from, for example, ETAK Inc., in Menlo Park, Calif., Navigation Technologies, in Sunnyvale, Calif., Roadnet Technologies, Inc., in Timonium, Md., or the Bureau of the Census, U. S. Department of Commerce, in Washington, D.C. These maps represent collateral information in the form of the topology of the area in which the mobile radio transceiver operates. The present invention seeks to use such collateral information to enable a control station (also at 10 in FIG. 6) to use directions observed from even a single sensor station together with the collateral information to determine the location of mobile radio transceivers operating in area 1.

Figure 2:
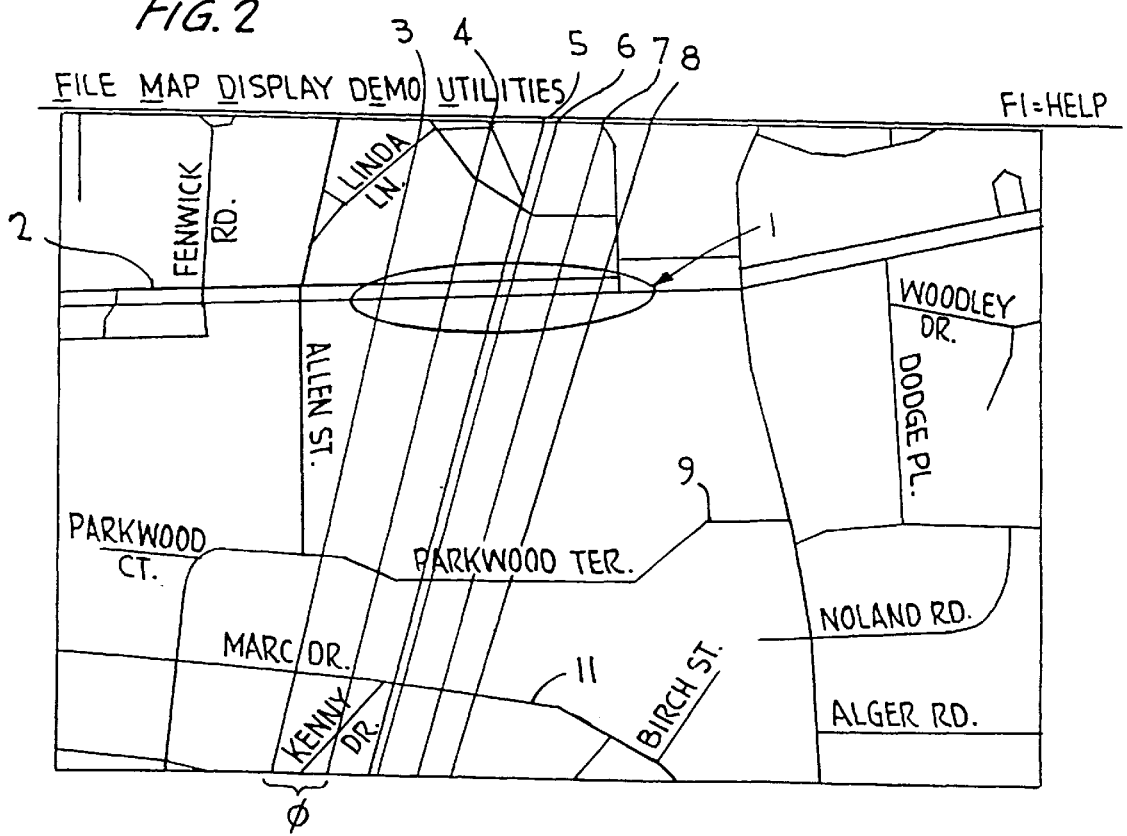
FIG. 2 shows an expanded view of the intersections of the directional lines of FIG. 1 with the road of interest.

FIG. 2 shows an expanded view of the localization area 1 shown in FIG. 1. The lines of bearing 3-8 are shown as crossing the streets labeled 9 (Parkwood Terrace) and 11 (Marc Drive). From any one of the lines of bearing 3-8, there is no way to determine on which of the streets 2, 9, or 11 the mobile transceiver is located. However, any two of the lines of bearing, for example 3 and 4, provides an arc length φ corresponding to some geographic distance covered by the mobile transceiver in area 1. Recording the time at which each of the lines of bearing are measured enables the control system 10 to determine an approximate speed of travel for the mobile transceiver in area 1. A high rate of travel, say 80 km/hr (50 mph), for a communicating cellular telephone implies that the mobile transceiver is on the main highway 2 (VA Route 50) rather than one of the residential streets 9 or 11 where the posted speed limit, 40 km/hr (25 mph), is half the observed rate. Thus, by applying collateral information in the form of the relative posted speed limits or the average speed distributions for the roads 2, 9, and 11 in FIG. 2, the control station 10 can infer on which street to place the probable localization area 1.

In the preceding example, it might appear that the control station 10 can not determine whether the mobile transceiver is on the main highway 2 or some other streets 9 or 11 solely from lines of bearing unless the transceiver is also moving at a high rate of speed. For the localization of a stationary transceiver, emergency (9-1-1) assistance would require some other form of collateral information. For example, the assisting dispatcher could obtain additional information by asking the parties requesting the assistance whether they are on a major road and, if not, seek some other form of descriptive information, such as street names or known landmarks, that would distinguish side streets 9 from 11. The geographic information inherent in such solicited data, when combined with the positional information in the line of bearing measurements, enables the estimation of the transceivers' locations.

Moreover, even the absence of motion has significance for other purposes such as monitoring traffic flow. Based on common traffic characteristics, the control station 10 could presume that most cellular telephone calls from the region of area 1 would originate from the main highway 2. The transceivers should predominantly exhibit a ground speed corresponding to the posted limits of the road. If the characteristic speeds of such transceivers are observed to be significantly below that of normal roadway conditions in or around area 1, such information would suggest that the main highway 2 is abnormally congested. Traffic alerts could be issued indicating the congestion, and emergency or other service vehicles could be dispatched to investigate the origin of the congestion if it suggests that an accident has occurred. None of these functions require additional information other than the timings of different lines of bearing and knowledge of normal road characteristics, but could always be augmented by such information if any is available.

Figure 3:
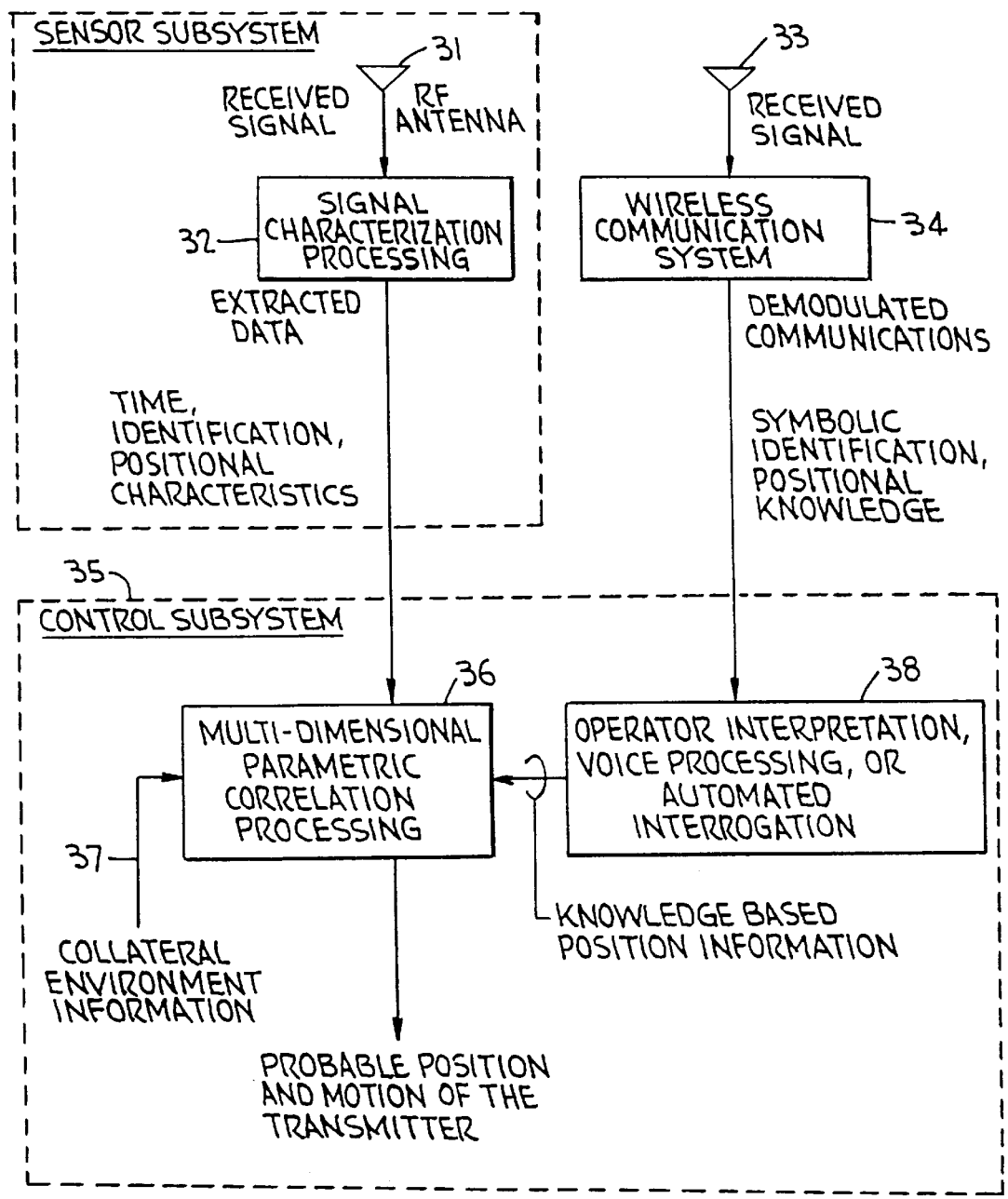
FIG. 3 shows the functional components of the system that enables the integration of directional and other characteristic signal information with the collateral geographic information derived from other sources to obtain the locations of wireless transceivers under normal communications operations.

FIG. 3 shows a block diagram of a system to carry out the present invention. A sensor subsystem 30 includes a RF antenna 31 that is connected to a signal characterization processing unit 32. The RF antenna 31 is a directional antenna that is designed to support the process of measuring the direction angle (i.e., line of bearing) of the arriving signal. A phased-array antenna station for obtaining such measurements is disclosed in U.S. Pat. No. 4,728,959 and incorporated herein by reference. The signal characterization processing unit 32 extracts the direction angle of arrival of the RF signal, and identifies the time at which such measurement is obtained. Such processing can be accomplished with statistical techniques as are also described in U.S. Pat. No. 4,728,959. With the phased-array antenna, the extraction of the bearing information from the characteristics of the received signal can be accomplished directly by statistically measuring the inter-signal phase differences of the signal forms received with the distinct antenna elements, since the signal passes the distinct elements at different relative positions and hence is sensed at different phases which depend upon the direction of arrival. Equivalently, the phased-array bearing determination can be obtained indirectly by exploiting these inter-element signal phase differences in comparative power analyses through "forming beams" or otherwise determining the direction from which the phase-differences are in alignment and thereby produce maximum received signal power when accumulated. As still another alternative, directional measurement can be obtained by mechanically turning the pointing direction of a parabolic reflecting or focusing antenna that structurally forms beams for the determination of maximal power reception.

The sensor system passively receives the radio frequency signals that occur in the normal use of the wireless communication system 32 and converts them into information for the control system 35 which is described below. In addition to the direction from which the signal has been received, this information includes the time at which a processed signal arrived and the identification of its transceiver, and can also include observations of collateral, position-related characteristics such as direction of motion or rate of change in direction of arrival, signal strength, and even two-way signal travel time in a communications system of very tightly controlled transceivers with transponding protocols and large signal bandwidth. By extending the time duration (i.e., the integration time or "dwell" time) over which the directional analyses of the captured signal are performed, the processing can produce the measure of the rate of change of bearing, as well as of the bearing itself. This rate of change can be detectable from the extended measurement process because the standard assumption of constant bearing during the measurement process will not be valid and will produce degraded measurements when the signal is received from a perceptibly moving radio transceiver. The rate of change of direction is related to the tangential velocity of motion of the communicating transceiver. As an added measure of the transceiver position, the characterization processing can determine the received signal power (i.e., the variance or mean square of the bias-free signal level). The signal power is indicative (through signal propagation evaluations discussed further below) of the range or distance from the receiving site to the mobile transceiver, and the rate of change of signal power or other power variation characteristics can be indicative not only of the radial speed of movement of the transceiver, but also of the physical obstructions or multipath interference causes that are known to accompany signal propagation from known geographic regions. Unobstructed two-way signal travel time is proportional to twice the range from receiving site to the location of the mobile transceiver. All of the measured physical characteristics of a received radio signal form the bases for localization processing in which the measurements are correlated with known relations to hypothesized transceiver position and motion.

The information regarding the lines of bearing and their measurement times and uncertainties is collected from one or more sensor stations and inserted into a multidimensional parametric correlation processing unit 36. The processing unit 36 combines the line of bearing information with other, collateral information from inputs 32, 37, or 38 to determine the location of the vehicle. The phrase "collateral information" applies to observed characteristics that augment the directional data and also includes information derived from sources other than the radio emissions of the mobile radio transceiver. Collateral information includes information on the environment in which the mobile transceiver is believed to be operating, e.g., the configuration of the roadway network, topographical features and boundaries, signal propagation characteristics, information on the weather and its effect on signal propagation and roadway traffic conditions, and also includes verbalized or other description of route number, road name, speed, nearby landmarks, or other position-sensitive information communicated from the mobile transceiver. The roadway and topographical representation data is available from distributors, such as those identified above for mapping data, of databases for geographic information systems. Additional data representing the posted speed limits of the road sections contained in the data bases are also generally available from the map data producers or alternatively from state government transportation departments. Additionally, the characteristic speed distributions of traffic on various road sections as a function of time of day, weather conditions, day of week, and season of year are often available from traffic flow studies that are routinely conducted by state departments of transportation. Alternatively, such data characterizing the positional dependencies of traffic flow can be accumulated from the flow statistics collected with the present invention in unambiguous events, and can then be recursively updated to obtain more rapid and robust determinations as the statistical precision of the databases is augmented.

The relationship between signal strength (i.e., power) and range is supporting information that can be available in a database as collateral data representing signal propagation characteristics. A standard relation between strength and range is that the received signal strength or power is inversely proportional to the square of range. However, in the multipath environment that normally characterizes short wavelength communications (such as that of cellular systems), the strength can be typically proportional to the inverse of the second to sixth power of the range and is highly dependent upon the direction of signal arrival and the weather conditions. Thus the utility of signal strength as an indicator of range depends on the accuracy to which the data base of collateral information represents the strength-to-range transformation, i.e., the signal propagation characteristics. For an approximate correlation of measures of signal power to the estimated range from receiver to mobile transceiver, signal propagation analyses can apply the static or dynamic projections of RF propagation predictions. Computer software facilities for such signal propagation projections are available from Applied Spectrum Research, in Boulder, Colo., C.E.T., Inc., in Edgewater, Fla., SoftWright, in Denver, Colo., or H2A Communications, in Moscow, Id. The propagation analyses can account for weather effects, ground topography and composition, and directionally dependent interference or background noise, as desired.

Knowledge of the terrain conditions along the approximate direction of signal arrival can be used in estimating their effect on signal propagation. Furthermore, geographic features, such as hills or water boundaries, limit the domain of candidate positions at which the transceiver could likely be located in known ways. Thus, such topographic information can also be used as collateral information to enhance the efficiency and accuracy of any determination of location.

In rural areas, it is contemplated that correlating the line of bearing information with collateral information in the form of topological map-matching (i.e., matching of location information to the known geographic locations of roads or other features of the landscape) would be enough in most instances to monitor traffic flow along main roads as well as to facilitate the dispatch of emergency vehicles and roadside assistance. Rural areas have relatively few roads such that a line of bearing from the sensor station to the mobile radio transceiver would be sufficient to uniquely identify the probable position of the mobile radio transceiver.

In urban areas, it is thought to be less likely that the line of bearing and roadway map information will be enough, by and of itself, to uniquely locate the position of the mobile radio transceiver. In such instances additional information may be needed. The present invention contemplates applying collateral information in a knowledge-based position information processor 38. Processor 38 could integrate information from additional sources such as the geographic representation of the knowledge and judgment of an operator of an emergency assistance (9-1-1) center regarding the apparent position or probable region of the mobile radio transceiver.

The present invention also contemplates receiving supporting, descriptive information from the wireless communications system. The position-dependent information extracted from the received RF signal can be augmented with collateral information from the wireless communications system 34 in FIG. 3. RF antenna 33 can be, for example, the base station of a cellular telephone system that is nearest the remote transceiver, e.g. cellular telephone. The wireless communication system 34 tends to the demodulation of the communications from the remote transceiver. The descriptive information received through the wireless communication system can include positional knowledge such as voice expression of the fact that the transmission is from a vehicle on a roadway or the name of the road on which the mobile transceiver is traveling, which can be transformed into symbolic identification for use as collateral information in the correlated localization processing with measured lines of bearing. In the case of requests for assistance (such as in 9-1-1 calls), the answering operator routinely asks for the persons placing the calls to identify their calling numbers and their locations. Callers who do not know where they are can still describe their surroundings over the telephone. Thus, the present invention is designed to aid the assisting operator by exploiting information that the operator can rapidly elicit to quickly provide accurate locations. With the expression of a route number or street name from a caller, the correlated intersection of that road with an estimated direction of signal arrival quickly provides the probable location of the caller. When the route of travel is not known by the caller, the assisting operator can solicit information about the speed of travel and the proximity of prominent landmarks that are along the observed direction of signal arrival. All such position-related information, whether obtained manually or by automated analysis, can then be transformed into geographical form through graphical interaction or automated geographic interpretation for inclusion in the correlated evaluation with the extracted signal characteristics.

The entry of the geographical knowledge or understanding of the operator or human information source may be assisted through graphical interaction between the human and a work station terminal equipped with a graphical pointing device for automated point determination. While observing a computer-driven map display of the relevant area of roads, the operator could use the graphical input device to select an approximate position, a road identified by a caller's voice, or an ellipse or polygon of probable location based on communicated descriptions. Mathematical transformations for conversions of position representations between planar projection coordinates used in geographic displays and geodetic reference coordinates used with navigation and location reference systems are described in U.S. Geological Survey Professional Paper 1395, titled "Map Projections—A Working Manual", by John P. Snyder, incorporated herein by reference.

Alternatively, the operator could provide a textual entry of a communicated or inferred road name, a speed, a landmark, or a road intersection that may be communicated, perhaps in response to the operator's queries. This textual data could then be converted into approximate position information through correlation with a text-to-position transformation database such as that contained in addressing databases of the United Parcel Service maps or the 9-1-1 databases of the Public Service Answering Points. In advanced system implementations, the queries for correlated information could be solicited under automated control by voice synthesis or by computer interaction with a processor integrated into a vehicle's communication device, and the responses could be analyzed by voice recognition processing or direct data interface for entry into the correlation processing with the extracted bearing and associated characteristic measurements.

Figure 4:
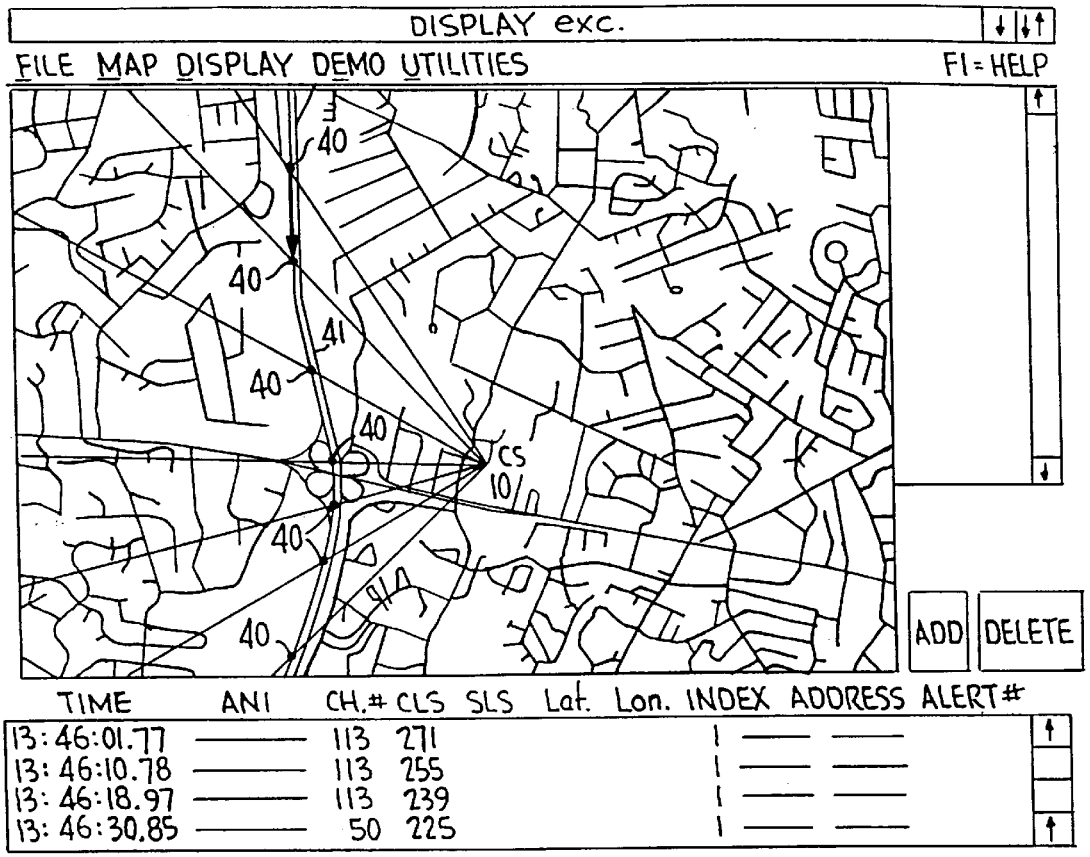
FIG. 4 shows a display of the intersections for directional data measurements with the road being traveled by an active cellular telephone, allowing the calculation of speed and direction of motion estimates.

FIG. 4 shows how to calculate the speed and direction of a mobile radio transceiver using information derived from successive measurements of lines of bearing with the example of a mobile radio transceiver 40 moving down a limited access highway 41 (Interstate highway 495 is shown). The operator or processor indicates points of intersection of the lines of bearing with a designated roadway (map-matching). The processor calculates the average speed between successive points. The rate of change of direction of arrival of a signal from the mobile radio transceiver 40 is proportional to the component of velocity of the transceiver that is perpendicular to the line of bearing from the receiver to the mobile transceiver. With the projection of this component onto the tangent to a candidate road at the point of intersection of the direction of arrival with the road, the corresponding speed and direction of motion can be estimated. Alternatively, the successive observation of directions of arrivals and the evaluation of the motion implications of their intersections with candidate road trajectories enable the more accurate estimation of motion parameters. Through correlation with a representation of appropriate road network speed distributions, further assessment of the probabilities that the estimated speeds could reasonably occur for each candidate route enables an even more likely estimate of the actual route being followed by the mobile transceiver.

The apparatus for the present invention can include general purpose processing facilities such as those of microprocessor workstations based on the Intel 80486 or Pentium central processing units (CPUs) or the Motorola 68040 or PowerPC CPUs. The correlation calculations will determine the optimal associations of measured bearings and other possible characteristics, communicated information, and/or human assessments with the supporting, collateral information stored on mass storage facilities such as the disks, CD ROMs, bubble memories, and tape drives common to such workstations and similar database servers. For rapid access to large quantities of geographical data of various types, the high-usage, mass-storage facilities should be interfaced to the data processing facilities via high-throughput, data communications paths, such as those employing direct processor-bus disk interfaces and ethernet interprocessor networks.

Figure 5:
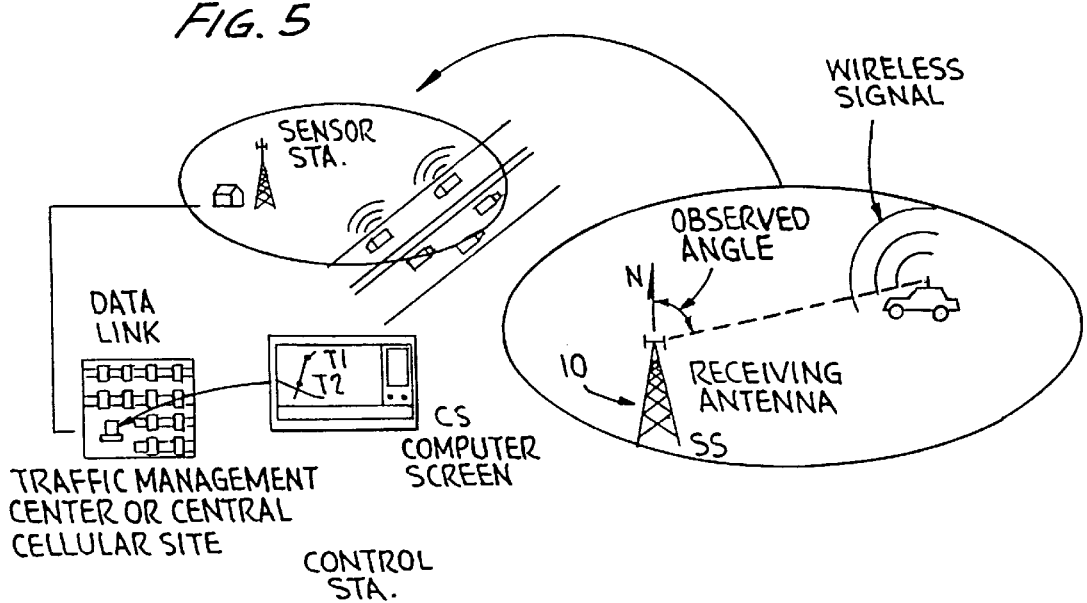
FIG. 5 shows a configuration for a system that applies the functions shown in FIG. 3.

FIG. 5 shows an implementation of the present invention applied as a way to monitor traffic flow using an existing cellular telephone network as the wireless communications system. The objective is to use a mobile transceiver 40 as a probe to determine the traffic flow along the highway 51. The representative cellular telephone 40 emits radio frequency signals that the receiver 32 at the sensor station 10 intercepts. Preferably, the information pertaining to the lines of bearing and other observed signal characteristics is then transmitted to a control station or traffic management center 53—preference should be given to transmitting the line-of-bearing and other characteristic information rather than the received signal or other such basic data to minimize the amount of information that is being transmitted. The line-of-bearing and correlated information is processed and can then be displayed on a computer monitor 54 together with other useful information derived therefrom such as the rate of travel of the vehicle on the highway 51.

Figure 6:
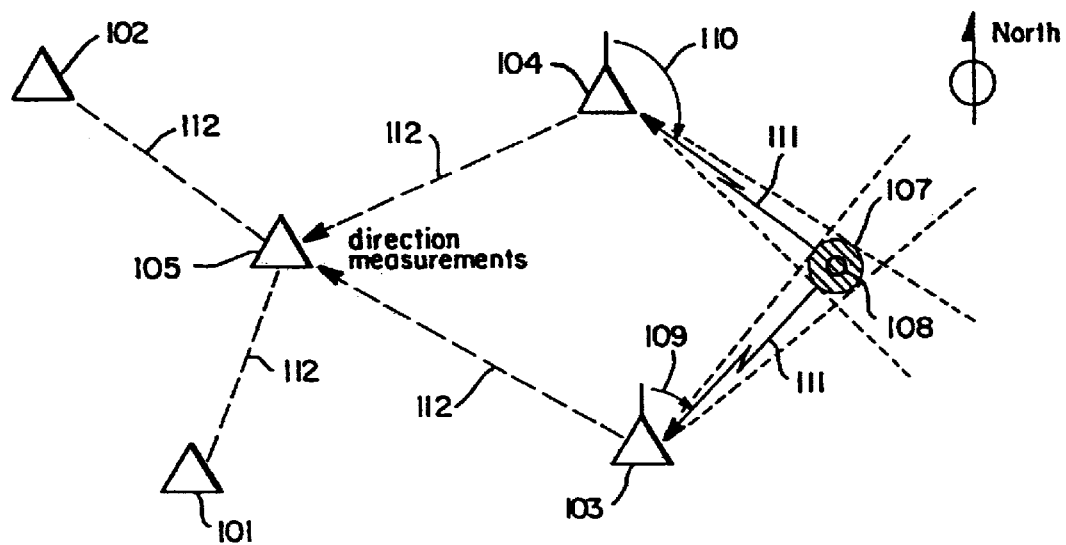
FIG. 6 illustrates the localization of the present invention using a network of land stations to obtain direction angle measurements for a mobile transmitter station.

FIG. 6 shows a network of land stations 101–105 such as typically comprise a cellular telephone network. A mobile radio transmitter station 108 radiates a RF signal 111 which is received by at least two land stations, 103, 104. The RF signal 111 may be any RF emission such as protocol signals emitted by a portable telephone in a cellular telephone network. The support land stations 103, 104 determine direction angles 109, 110 relative to a fixed reference direction such as north. The direction angles are transmitted to a control land station 105 by way of the communications and control system of the localization network 112. The communications link may be standard modems, telephone land lines, microwave links, etc., of types that are well known in the art. The control land station determines an area of uncertainty 107, with central position 108, according to the standard deviation of the measured angles of direction 108, 110.

Figure 7:
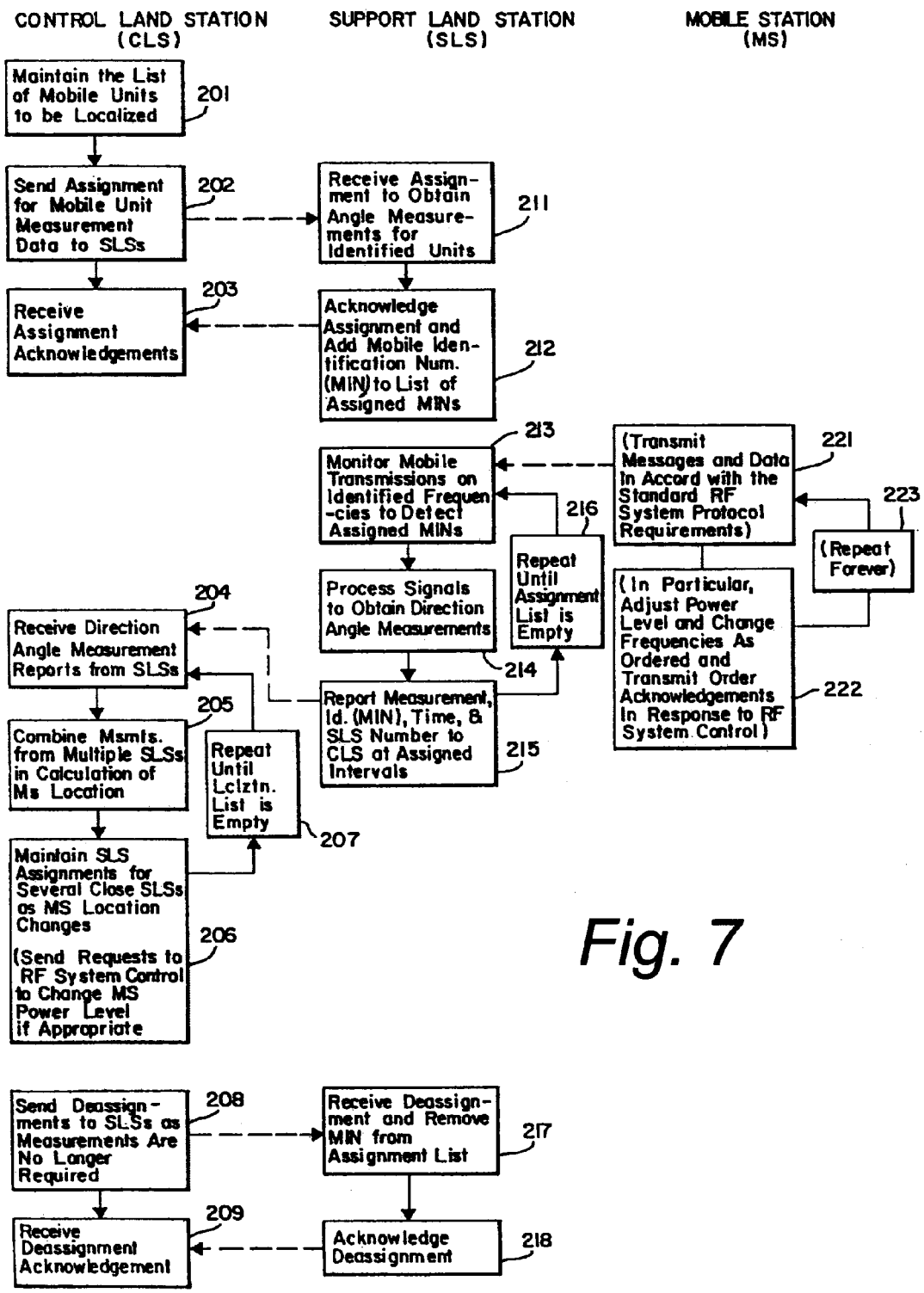
FIG. 7 is a flow chart showing various interactions of the stations shown in FIG. 6.

FIG. 7 shows the functional interaction of the mobile transmitter, support land stations and control land station shown in FIG. 6. The control land station maintains a list of the mobile transmitters to be localized as shown at step 201. For each transmitter that is to be localized, the control land station assigns support land stations to measure angles of direction of a mobile transmitter to step 202. Which land stations are used for the localization depends on whether the land station is in range of the RF signal, the number of localization requests directed to a particular land station at a given moment and frequency, and the maximum number of localization requests that a given land station can handle at once. The support land stations receive the request to measure the direction angle of a particular mobile transmitter at step 211 and acknowledge receipt of the request at step 212 by the identification number of the mobile transmitter station to be localized. The control land station receives the acknowledgment at 203 and stops attempting to form the subset of base support land stations once all stations, or at least a reasonable number of stations, have acknowledged their localization assignments. The control land station then waits for the support land stations to begin returning angle measurements.

As indicated in step 213, the support land station monitors the transmissions of the mobile transmitter station at the prescribed frequencies and processes the signals to step 214 to obtain a measurement of the direction angle. All direction angle measurements obtained for mobile transmitters on the localization list are reported to the control land station at 215 at predetermined time intervals. The support land station continues to monitor for a predetermined period of time all mobile transmitters on the localization list as indicated at step 216 until a direction angle measurement has been returned for each on the assumption that eventually the mobile transmitter broadcasts protocol messages at step 221. The protocol messages may be modified as necessary at step 222 to allocate frequency space in the service area and maintain sufficient signal strength at the support land stations for the localization and communication processes. The process of modifying the signal from the message for the mobile transmitter is analogous to the hand-over process for transferring between cells in a cellular telephone network except that the control land stations may adjust the frequency and strength of the signal from the mobile transmitter station to be received at more than one station. The foregoing process is repeated at more than one station. The foregoing process is repeated essentially forever as indicated at step 223 as is customary for a mobile telephone in a cellular telephone network.

At step 204 the control land station receives the measurements of the direction angles from the support land stations. The control processor of the control land station combines the direction angle measurements for each mobile transmitter at step 205 to determine the position of the mobile transmitter station. The control land station reassigns the support land station as necessary as step 206 or instructs the mobile transmitter station to adjust its radiated power or operating frequency as discussed above. The localization process is repeated as shown at step 207. Finally, the control land station instructs the support land stations to disengage the localization procedure at 208 once localization is no longer required. The support land stations receive and acknowledge the disengagement instructions at steps 217, 218, respectively. The control land station acknowledges receipt of the disengagement acknowledgement at step 209 and terminates the localization process.

In an alternate embodiment of the present invention, a systems network control center may assign different land stations to function as the control land station and support land station as required to localize a particular mobile transmitter station. The functions of the individual land stations would change as the mobile transmitter station moved through the service area of the network. The distribution of control land stations across the network would be determined by the location of mobile transmitter stations in the service areas as well as the list of support land stations assigned to each mobile transmitter station. Similarly, each support land station would maintain a list of all mobile transmitter stations and control land stations for which it was responsible for reporting directional data and the control land station to which the directional data is to be sent. Considering the example of a cellular communications telephone system, the distribution of functions for both the control land stations and support land stations may be performed at the same cell sit responsible for maintaining telephone service to the mobile telephone which corresponds to the mobile transmitter station. The functions of the support land station may be performed by the receiver station for at least one, and preferably more, neighboring cells.

Figure 8:
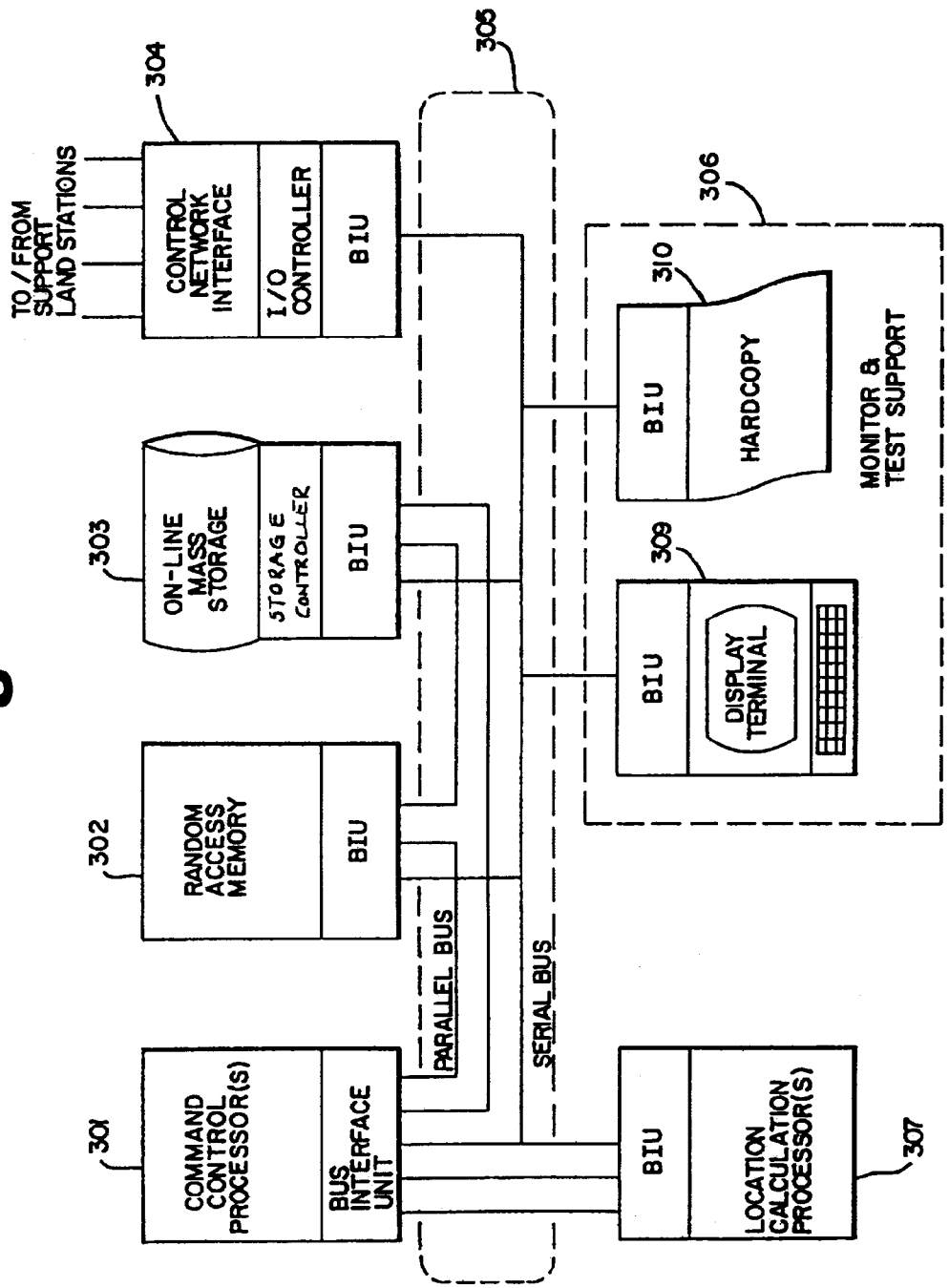
FIG. 8 is a block diagram showing an apparatus for performing the localization functions shown in FIG. 7.

FIG. 8 presents a block diagram of the data processing equipment required for implementing the command and control processing steps at the control land station shown in FIG. 7. The command and control processor 301 includes a bus interface unit for communicating with and controlling the various components of the control land station along data bus 305. As presently contemplated, the command an control functions would be performed using 32-bit microprocessor technology such as found on, for example, the Motorola MC68020 or Intel 80386 chips in combination with a Motorola VME bus or Intel Multibus II, respectively. Command and control processor 301 has access to additional memory through RAM expansion module 302 and even greater masses of data through mass storage device 303 through appropriate bus interface units and storage control units. Network interface unit 304 connects the command and control processor with the hard copy device 310 may be added to data bus 305 as represented by box 306. A system which integrates the processor is the system 19 family of advanced systems platforms produced by Counterpoint Computers of San Joe, Calif. Additionally, a location calculation processor 307 may be connected along the data bus to speed the necessary positioning calculations. In the preferred embodiment of the present invention, the location calculation processor 307 would be integrated with the control facilities and operate on the same 32-bit processing technology. This integrated system uses floating point arithmetic such as is provided on a Motorola MC68881 chip.

Command and control processor 301 controls the interrupt driven multitasking operating system by executing the pre-programmed localization control tasks. For example, one basic task is maintaining the list of mobile transmitters which are to be localized. Localization requests may be entered from a display terminal 309 or a remote user terminal through a network interface such as unit 304 and stored in storage units 302 or 303. Control network interface unit 304 communicates requests for direction angle measurements to the support land stations. Command and control processor 301 receives the measurements of the direction angle from the support stations through network 304. The direction angle measurement are associated with their corresponding identification numbers and stored for eventual localization processing. Localization calculation processor 307 periodically retrieves the direction angle measurements for a particular mobile transmitter and determines its position. Localization calculation processor 307 periodically retrieves the direction angle measurements for a particular mobile transmitter and determines its position. The positional information returns to command and control processor 301 which stores the information in an appropriate list corresponding to the mobile transmitter station that was localized. The results of the localization process may be displayed on demand either at local display terminal 309 or at a remote location through a network interface control such as a unit 304.

Figure 9:
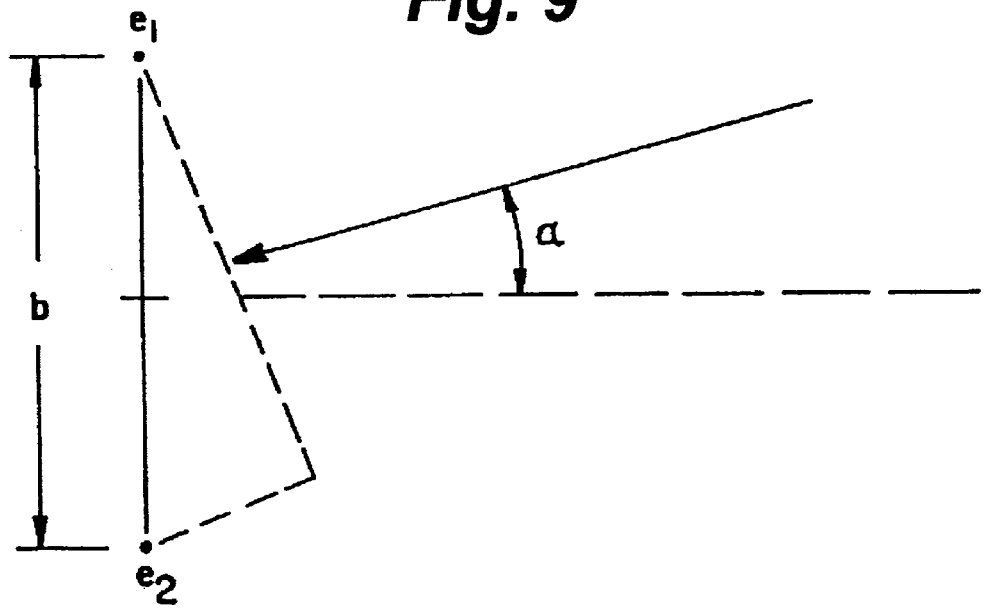
FIG. 9 illustrates an antenna arrangement for the preferred embodiment of the present invention.

FIG. 9 shows a configuration of paired whip monopole or dipole antenna elements that may be used to measure the angle of direction of a mobile transmitter station cheaply and accurately. Two antenna elements, $e_1$ and $e_2$, are separated by base line distance b and receive a signal along direction angle a which is measured relative to the perpendicular bisector of the base line connecting the antenna elements. Assuming that the mobile transmitter is sufficiently far from the antenna that the RF signal from the mobile transmitter station is a plane wave when it arrives at the antenna, the RF signal travels as additional distance b sin a from the first antenna $e_1$ to reach the second element $e_2$. Thus the electronic analog of the RF signal in the antenna elements have a phase difference corresponding to:

$$p = 2\pi j(f/c) b \sin a;$$

where $f$ is the frequency of the RF signal, c is the speed of propagation of the RF signal, which is essentially the speed of light, and b represents the spacing of the antenna elements which is preferably approximately equal to one half a wavelength of the RF signal or $c/2f$. The direction angle $\alpha$ is obtained by measuring the difference in phase between the same arriving at each antenna element. The direction angle may be expressed as:

$$\alpha = \sin^{-1}[pc/(2\pi f b)];$$

and the standard deviation s.d. corresponding to the variation of the angle measurement is:

$$s.d. = [c/(2\pi f b \cos a)] \times s.d._p$$

where s.d.$_p$ represents the standard deviation of the phase of the RF signal. It is to be appreciated that the RF signal may have a significant, independent standard deviation because of factors such as multipath interference of the signals received at the closely spaced antenna elements is comparatively small.

As expressed above, the angle uncertainty is exceedingly large if the direction of arrival is nearly parallel to the base line so that cos α approaches zero. The preferred embodiment of the present invention uses an antenna configuration having three or more pairs of elements, for a total of six elements, which may be paired to measure the phase angle. The element pairs may be situated at the vertices of an equilateral triangle which is attached to a common antenna mast. Phase relationships are measured between the elements at each of the three pairs of and the control processor of the land station selects the antenna pair in which the signal of the antenna elements arrives most nearly at the same time. The antenna array never measures a direction angle of more than 60 degrees so that the angular resolution o the antenna pairs is never degraded by more than a factor of 2. Thus, if the interelement base line is equal to ½ the wavelength of the RF signal, then the directional resolution stays within the limit $$s.d. \leq 0.637 \; s.d._p$$

The random uncertainties in the measured phase relationships are compounded by physical uncertainties as to the separation and orientation of the pairs of antenna elements. These relationships, however, may be mitigated by calibrating the antennas once installed and thereafter periodically maintained by measuring the directions to the known positions of neighboring land stations.

Figure 10:
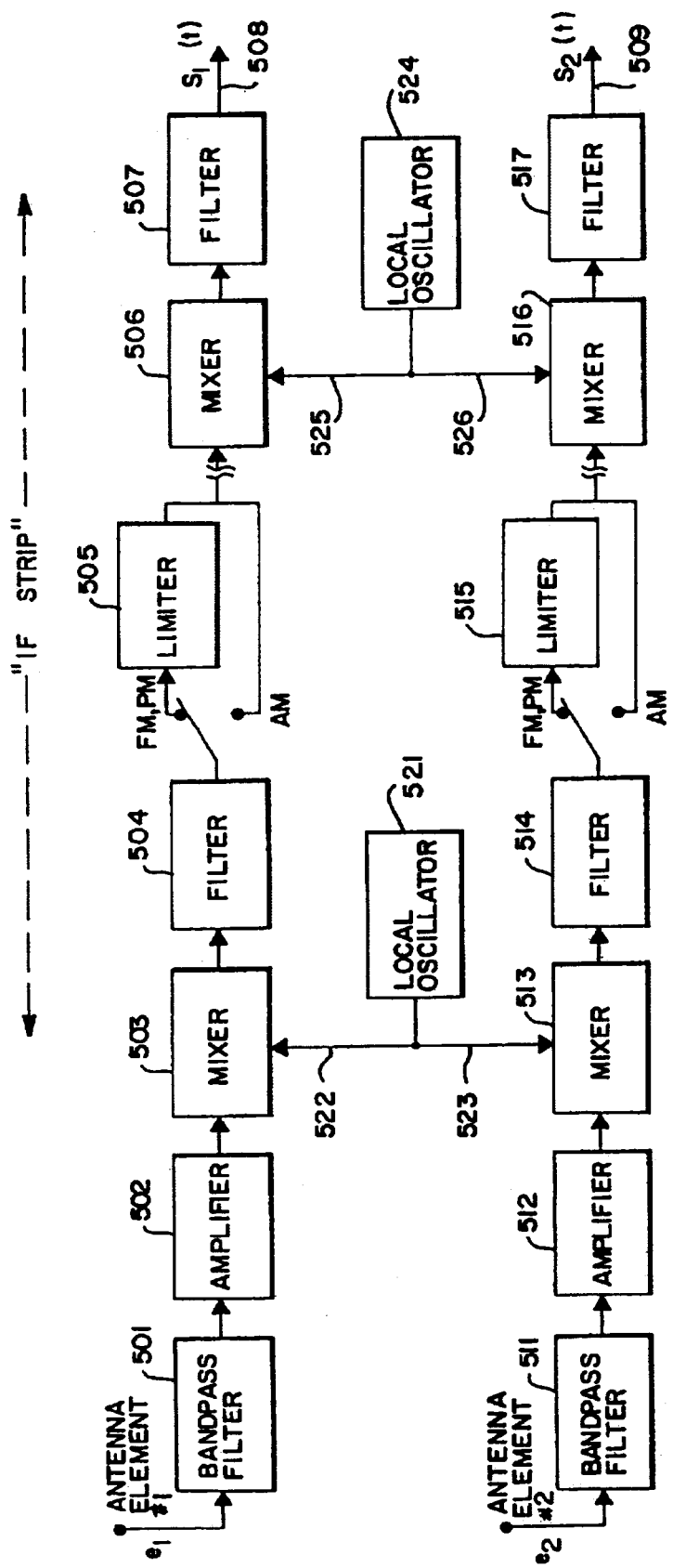
FIG. 10 is a block diagram of an analog receiver for synchronizing the pairs of phase element antennas in FIG. 9.
Figure 4:
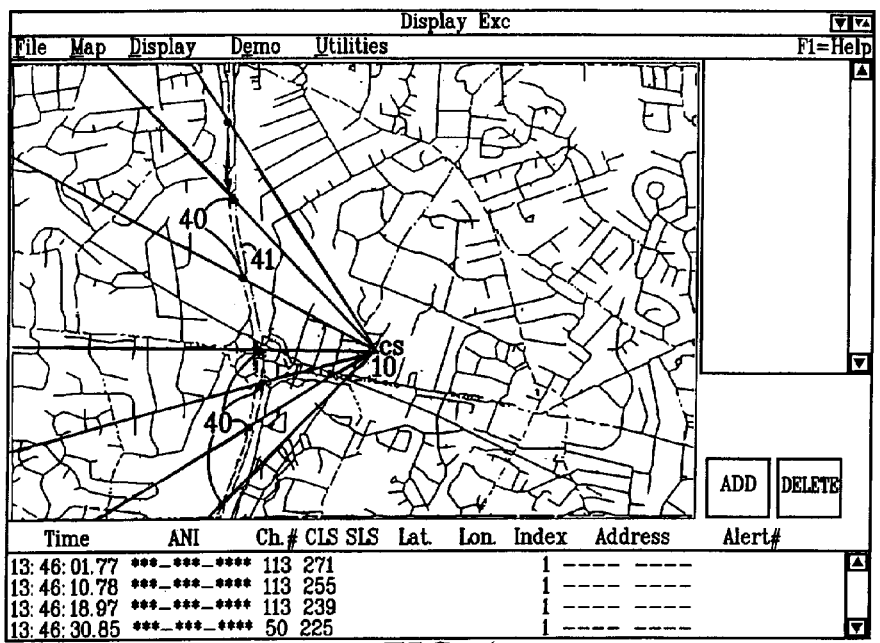
Figure 5:
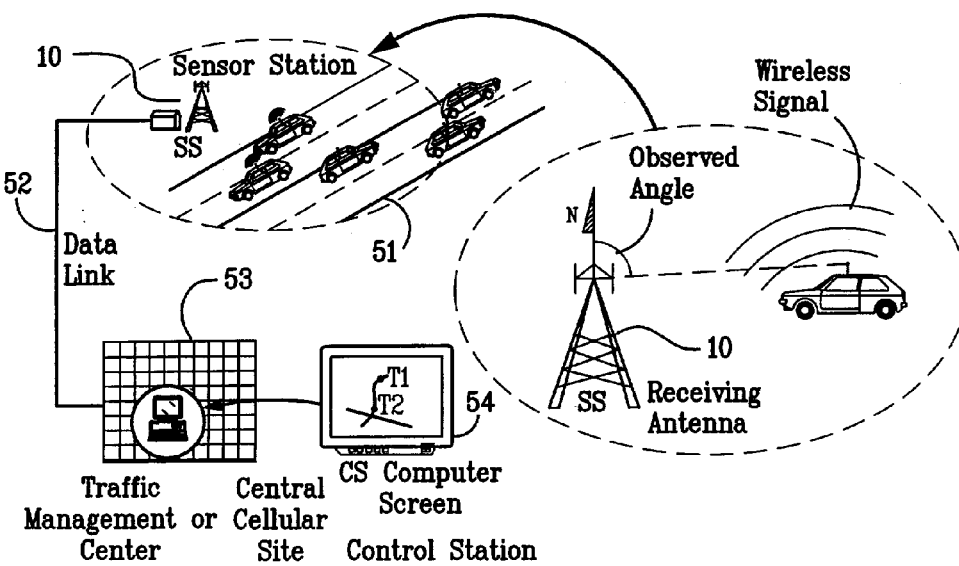

FIG. 10 is a block diagram of an analog receiver for synchronizing the pairs of phase element antennas of the present invention. The radio frequency signal received at antenna element pairs $e_1$ and $e_2$ is supplied to bandpass filters 501 and 511 and an amplifier state 502, 512, respectively. Signal lines 522 and 523 supply mixers 503 and 513 with the same clock signal from local oscillator 521 so as to maintain the phase relationship of the RF signals received by antennas $e_1$ and $e_2$. Additionally, mixers, such as 506 and 516 may be added to the IF strip so long as each pair of mixers is connected to a common local oscillator 524 by appropriate signal lines 525, 526.

In addition, the signals from each element of the antenna pass through filter stages 504, 514, 507 and 517 so that the RF strip passes only the appropriate frequency of RF signal. Further, limiter stages 505 and 515 may be desirable where the signals of interest have been modulated by either a discreet phase or frequency shift keying, or by continuous phase or frequency variation. As shown in FIG. 10, conventional limiter stages are inserted after the first mixer stage to reduce any amplitude modulation effects produced by, for example, additive noise or propagation fluctuations caused by multipath interference. The amplitude of the respective signals may be further equalized in succeeding quadrature transform stages as discussed below. All necessary analog receiver devices illustrated in FIG. 10 are well known in the art and not a subject of the present invention.

Eventually, the signals from antenna elements $e_1$ and $e_2$, $s_1(t)$ and $s_2(t)$ respectively, are tapped from the IF strip and fed to a signal processing stage, an exemplary block diagram of which is shown in FIG. 11. The point at which the RF signals are tapped depends on the processing speed of the digital signal processing stages. Once tapped, the signal from each antenna element undergoes a translated Hilbert transform to produce an analytic signal from which the phase difference may be accurately determined. The Hilbert transform of s(t) is defined as $$\hat{s}(t) = P\left[\frac{1}{\pi}\int_{-\infty}^{\infty}\frac{s(\hat{t})}{t-\hat{t}}d\hat{t}\right]$$

Where P denotes the Cauchy principal value of the integral. The Hilbert transform may be expressed as the convolution $$\hat{s}(t) = \frac{1}{\pi t} \circ s(t)$$

Since the Fourier transform of 1πt is represented as $$\mathscr{F}\left[\frac{1}{\pi t}\right](f) = -i\,\text{sgn}(f) = \begin{cases} -i, f > 0 \\ 0, f = 0 \\ +i, f < 0 \end{cases}$$

it follows that the Fourier transform of the Hilbert transform ŝ(t) is $$\mathfrak{I}[\hat{s}](f) = -i\,sgn(f) < \mathfrak{I}[s](f)$$

An analytic signal is defined as $$y(t) = s(t) + i\,\hat{s}(t)$$

Thus, the Fourier transform of the analytic signal is $$\mathscr{F}[y](f) \equiv Y(f) = \begin{cases} 2S(f), f > 0 \\ S(0), f = 0 \\ 0, f < 0 \end{cases}$$

Where S(f)=F [s](f) is the Fourier transform of the original signal s(t). Hence, the analytic y(t) as formed by the quadrature combination of the signal s(t) and its Hilbert transform ŝ(t) consists of only the positive frequency components of s(t). Expressed in the alternative, $$y(t) = a(t)e^{i\phi}(t);$$

i.e. the analytic signal comprises a time variant amplitude signal a(t) and time dependent, "instantaneous phase" signal φ(t). In addition, the analytic signal can be frequency translated to take the form $$z(t) = e^{-i2\pi ft} \times y(t)$$
$$\cong r(t) + iq(t)$$

where z(t) is a complex valued signal with both positive and negative frequency components that are equal to the positive frequency components of y(t), albeit offset in frequency by an amount represented as f. Thus, if the signals from two antennas, $s_1(t)$ and $s_2(t)$, are transformed into analytic signals $y_1(t)$ and $y_2(t)$, the corresponding frequency translated forms are $$z_1(t) = e^{-i2\pi ft}y_1(t);$$

and $$z_2(t) = e^{-i2\pi ft}y_2(t),$$

ate product of $z_1(t)$ and $z_2(t)$ is the same as the conjugate product of $y_1(t)$ and $y_2(t)$ taken directly. Thus, the difference in the phase between two signals may be determined directly from the translated analytic signals.

The foregoing discussion is not intended to be an exhaustive discussion of the use of Hilbert transforms in signal processing. The use of Hilbert transforms is discussed by Oppenheim and Schafer, *Digital Signal Processing*, 337–375 (1975), and Brown, *Hilbert Transform Product Theorem*, Proceedings of the IEEF, No. 3, March 1986, and references cited therein. Rather, the foregoing discussion is intended to illustrate a particularly efficient and accurate method for measuring the difference in the phase between two radio frequency signals. A person of ordinary skill in the art will readily appreciate that the foregoing method of signal processing will produce a more accurate measurement of the apparent direction angle to a mobile transmitter unit than used in the prior art and, therefore, represents an substantial advance in the state of the art.

Referring to FIG. 11, signal $s_1(t)$ and $s_2(t)$ are time varying signals from an antenna element which are formed into complex valued signals or phasor signal pairs $r(t)$, $q(t)$ at analytic transform steps 601, 611, respectively. FIG. 12 shows the details of the translated analytic transform. The real-valued signal is acquired at step 701. The complex signal is frequency translated by a complex heterodyne unit at step 702 and filtered through lowpass filters at step 703 and 704 to form a translated representation of the analytic signal in the form of quadrature combinations of the original signal s(t) as well as the Hilbert transform of s(t). A mixing stage for the analytic transforms 605 combines the components of both antenna element pairs to obtain a phasor signal pair as follows:

$$u(t)=r_1(t)r_2(t)+q_1(t)q_2(t);$$

and $$v(t)=r_1(t)q_2(t)-q_1(t)r_2(t).$$

The analytic transform signals are effectively integrated by integrator 606 in response to an identification control signal communicated along line 607 from signal identification unit 608. Signal identification unit 608 contains a conventional detection circuit 621 connected to a demodulator 622. An identification demultiplexing and decoding stage 623 determines whether a radio frequency signal is being received and whether that signal contains the identification number of the mobile transmitter to be localized. If so, an identification control generation unit 624 generates an identification control signal along line 607 to enable the identification specific integration unit 606.

Identification specific integrator unit 606 integrates for an arbitrary time period T to obtain a phasor pair $$U=\{T\}w(t)u(t)dt;$$

and $$V=\{r\}w(t)v(t)dt;$$

Where w(t) is a dynamically determined, non-linear weighting function that depends upon the identity, amplitude and phase of the phasor samples. For example, when more than one transmitter shares a single frequency channel through time division multiplexing, the processing is time gated so that the (U,V) pair for each particular transmitter is accumulated only during those identified intervals when the signal from that transmitter is active in the channel. As illustrated in FIG. 11, the identification control signal 607 is generated by fully processing the detected, demodulated and time and frequency demultiplexed and decoded output of one element of the antenna array so as to exploit the amplitude threshold and transmitter identification information contained thereon. For a cellular telephone system, the complete set of signal identification functions 508 may be implemented in a CE-4400 signal analysis device manufactured by Cushman Electronics, Inc. of San Jose, Calif.

Additionally, a dynamically estimated form of the probability density function for the phase angles may be selectively evaluated by performing a selective phase transform at step 609 from the signal samples that are stored in RAM memory so as to detect the presence of multipath interference. Upon subsequent processing, the integration weights are made functionally dependent upon both amplitude and phase thresholds of the measured signal. With the non-linear weighting function w(t), the (U,V) for each transmitted frequency is obtained by integrating the set of time intervals from each mobile transmitter with effective cumulative duration of T. The desired phase angle measurement p is processed in step 609 according to the relationship
ti $p=\tan^{-1}(U/V)$.

A direction angle transform at step 610 obtains the measurement of the angle of direction by applying the relationship $$\alpha=\sin^{-1}[pc/2\pi fb).$$

Finally, the direction angle transform may calibrate the direction angle with respect to a reference direction, such as north and compensates for any corrections for the orientation of the antenna elements. The output from steps 610 contains the direction angle bearing of the mobile transmitter from the support land station.

The preferred embodiment of the present invention expresses measurements of the angle of direction in relation to the precision of each phase measurement which is related to the signal to noise ratio (SNR) of the extracted signal from each antenna element. The SNR for each antenna element is presumptively the same since the elements are preferably spaced within a wave-length of each other. Given an SNR which is sufficiently above zero dB for a phasor signal obtained from a bandwidth B with an effective integration time T, the relationship of the phase precision to the SNR is expressed as:

$$s.d.p = \sin^{-1}\left[(1/SNR)\sqrt{(SNR+0.5)/(TB)}\,\right]$$

The particular choice of processing parameters may be evaluated with the aid of the foregoing expression. In a cellular telephone system, for example, the response signals of a control channel are continuously available and have a duration of 50 milliseconds with a trailer duration of at least 25 milliseconds so that each phase measurement may involve integrating the signal for at least 50 milliseconds. Given a cellular channel spacing of 30 kHz, the IF bandpass process may be presumed to obtain 20 kHZ. Further, SNR is normally adjusted to maintain a standard operating value of ±18 dB and a minimum SNR of at least ±12 dB. Given an equilateral antenna configuration discussed above, the standard deviation works out to be less than or equal to 0.29° which corresponds to a tangential uncertainty of approximately 50 meters when the vehicle is located 10 kilometers from the support land station.

FIG. 13 is a simplified block diagram of the principal components required to implement the digital signal analysis of the present invention. The RF signal from lines 508, 509 forms the input of digital signal acquisition unit 801. FIG. 14 shows the composition of the digital signal acquisition unit. The analog signal from the IF strip supplies an input to isolation amplifier and buffer 902 and a sample and hold unit 903 which serves to "freeze" the analog signal. An analog-to-digital converter unit ADC 904 receives the output from the sample and hold unit 903 and supplies an input to a memory buffer unit 905 that has a FIFO first in, first out management structure. Digital signal acquisition unit 804 passes, on an interrupt service control basis, the appropriate digital signal information under the control of the digital signal processor unit 807.

The ADC 904 may comprise any of a number of analog-to-digital converter units such as the A/D/A/M-724 from Analogic Corp. of Wakefield, Mass. Or a "flash" ADC such as the TDC1029 from TRW Corporation of La Jolla, Calif. The A/D/A/M-724 has a sampling rate of 100 kHz with a precision of 14 bits per sample. In comparison, the TDC1029 has a sampling rate of 100 MHz and 6 bit precision but requires virtually no buffering from sample and hold unit 903. The relative speed, precision and cost of the ADC units with their associated buffering units are design considerations for a particular system. Generally, the higher signal sampling rates obtained for wider bandwidth signals require fewer mixing stages in the analog receiver circuit shown in FIG. 10. Higher signal sampling rates also produce more precise signal and angle measurements for low SNR. A higher sampling rate requires faster arithmetic computation and, possibly, a larger FIFO memory buffer 905. In general, however, the amount of analog signal processing should be minimized.

Once acquired, the digitized data signals pass from digital signal acquisition unit 801 through interface unit 814 to digital signal processor 809. Signal processor 809 preferably has an integrated configuration such as the vortex two board set manufactured by Sky Computers, Inc. of Lowell, Mass. And TMS 320C25 chip manufactured by Texas Instruments of Dallas, Tex. The signal processor typically provides 10 million multiplications and additions per second. The Vortex produce a floating point output and the TMS 320 results in a fixed point integer format. Both units contain a signal processor controller unit 807, a memory unit 806 and an arithmetic processing unit 808 connected along a common signal processor bus 805.

The output of signal processor 809 is fed through an interface unit to a control processor data bus 812. Overall management and control of the localization processing at the support station is implemented by support control processor 810. The control processor, In combination with memory unit 811 and network interface unit 813, preferably comprise the types of 32 bit microprocessor based elements discussed in connection with the control station apparatus. Assignment commands for each support station are sent along the control network and stored in RAM memory unit 811. The list of localization assignments for which the land station is responsible is maintained and updated in response to control station commands. In addition, the support processor collects information from the signal identification processing unit 814 which responds to the identification code of a mobile transmitter station received along line 508,509. Signal identification processor 814 may comprise a CE-4400 monitor unit from the Cushman Electronics Corporation of San Jose, Calif. Or any standard signal detection and identification unit implemented with the aid of a signal processor 809.

Each time signal processor 809 obtains the measurement of a direction angle for an assigned mobile transmitter of a direction angle for an assigned mobile transmitter station, a measurement-identification-time (MIT) message is formed in the support control processor 810. The MIT message combines data for the direction angle with the identification number of the mobile transmitter station and the identification number of the support land station and the approximate time at which the direction angle measurement was made. It is to be appreciated that he timing measurements need have only enough accuracy to uniquely identify the emission from the mobile transmitter from which the direction angle measurement was made, which typically corresponds to an accuracy of a few seconds. The data measurements are sent to the control land station through interface unit 813.

The preferred embodiment of the present invention preferably selects measurements of direction angles from 5 to 7 land stations so as to avoid the sensitivities to multipath interference. The set of angle measurements is analyzed with standard, non-linear least squares procedures as discussed above. Additionally, the calculations may include information on signal strength as a rough indication of distance of the mobile transmitter station from any particular land station or information on inter-station or stimulated signal arrival time differences as an indication of distance relations as available.

The relationship of a particular angle of direction from a land station having a known location to a mobile transmitter station is a non-linear function of the location coordinates. Therefore, the present invention uses iterative non-linear calculations to derive the position of the mobile transmitter station. These procedures are summarized by Sorenson, *Least-Squares Estimation From Gauss to Kalman,* IEEE Spectrum, No. 7, July 1970, and references cited therein, all of which are incorporated herein by reference. Given a determination of position, a CHI-squared confidence level is determined with respect to the number of degrees of freedom to determine whether the measurement data has an acceptable level of internal consistency. Measurements containing large residuals are discarded in calculating subsequent solutions.

The foregoing evaluation procedure, when used with the signal processing already described, provides a localization system which is particularly insensitive to errors introduced by multipath interference.

The method of estimating the position according to the present invention involves establishing a perimeter of uncertainty in the information corresponding to a 2×2 covariance matrix. The standard deviation of each parameter is obtained by the square root of the appropriate diagonal element of the matrix. An area of uncertainty corresponds to $\pi$ times the square root of the determinant of the covariance matrix. The covariance and confidence level information is stored under the same label as the location information.

The precision of any particular localization with the present invention depends on several factors, such as the relative orientation of the mobile transmitter station with respect to the antenna elements and the number of measurements used to determine position. The covariance matrix itself is the inverse of a Fisher information matrix that is attained by adding the contributions from all sets of independently measured data. Thus, the standard deviation of the location of the mobile transmitter station is inversely proportional to the square root of the number of measurements. If only two measurements are used and the angles of measurement cross at right angles with respect to one another, the standard deviation of each coordinate positioned perpendicular to the line of bearing equals the standard deviation of the direction angle measurement multiplied by the distance from the receiving antenna to the mobile location. As described above, the standard deviation corresponds to 50 meters at a distance of 10 kilometers from an antenna site.

The principles, preferred embodiments and modes of operation of the present invention have been set forth in the foregoing specification, from which it should now be readily apparent that a person of ordinary skill in the art may implement appropriate data processing routines. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously envisioned. Numerous variations and changes can be made to the foregoing illustrative embodiments without departing from the scope and spirit of the present invention as set forth in the appended claims.

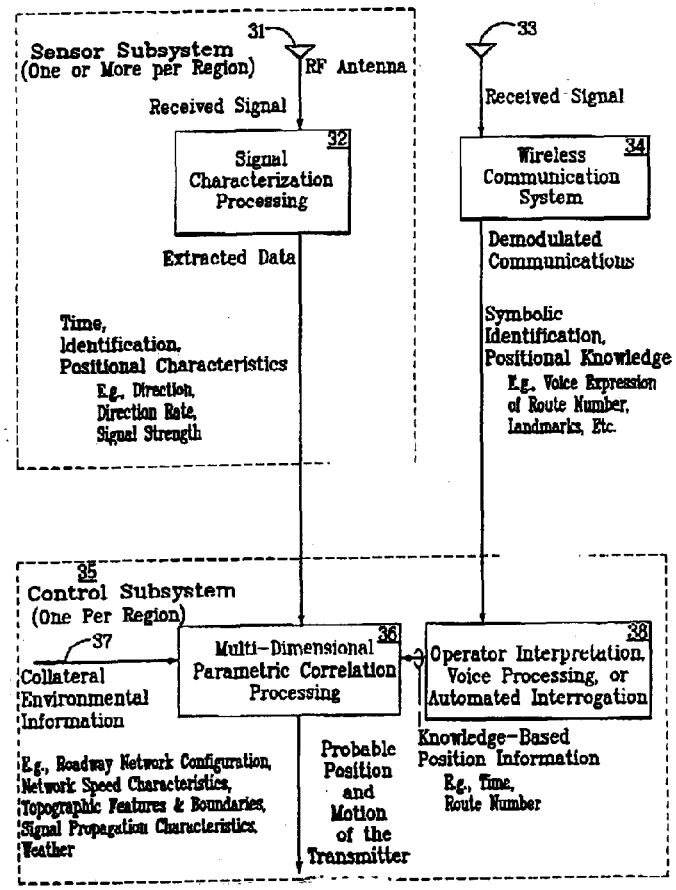

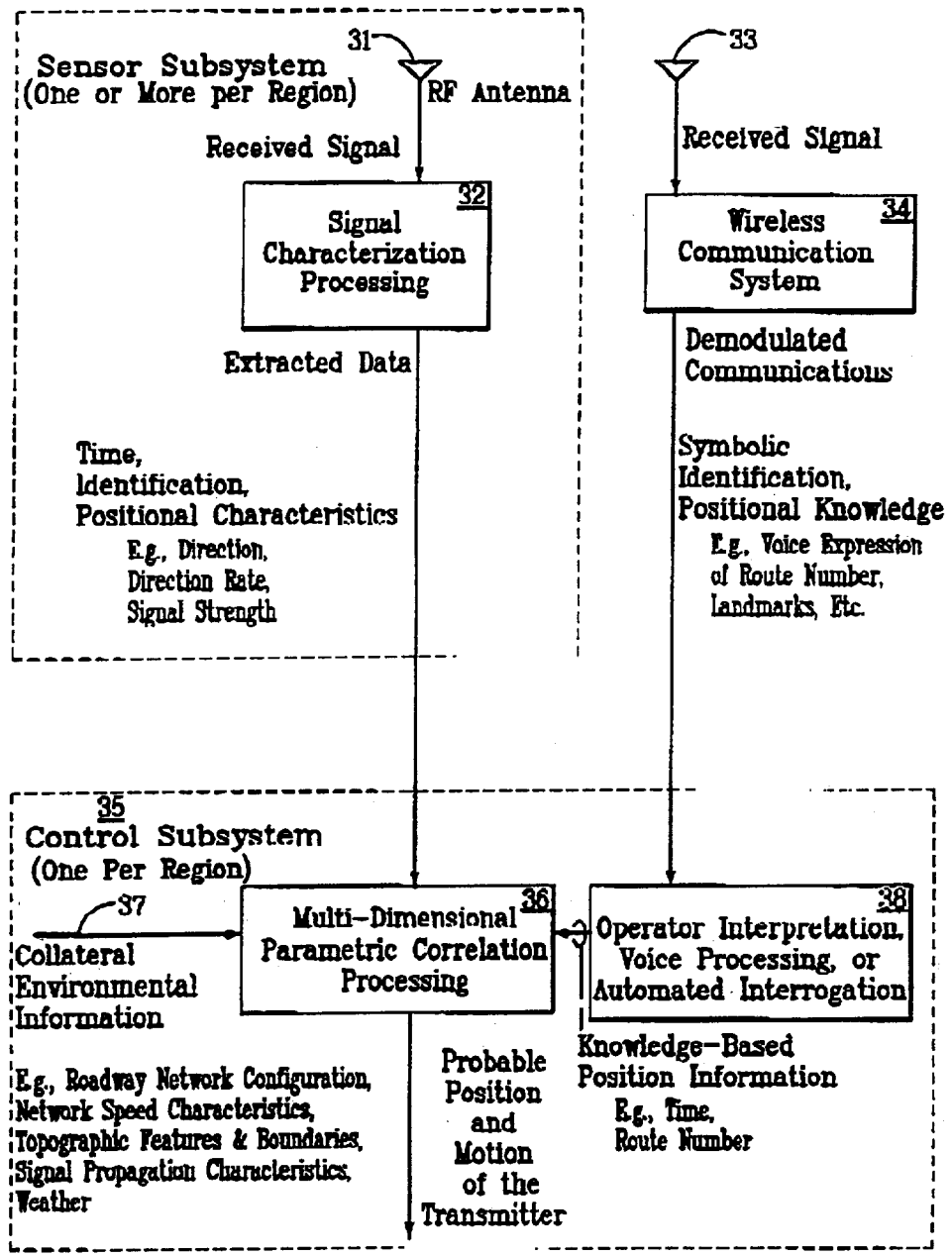

What is claimed is:

1. An apparatus for locating a mobile radio communications transceiver in an operating environment served by a wireless communications system, comprising:

at least a single sensor station having a multi-element antenna and signal receivers to receive radio signals from the mobile transceiver;

a signal characterization processing unit for measuring at least one integrated complex inter-element product of the signal representations of the radio signals received from the mobile radio transceiver by said single sensor station;

a source of collateral information including a database of position-dependent, propagation-affected, complex products measured from the operating environment of the mobile transceiver;

a multidimensional parametric correlation processing unit for determining a probable position of the mobile transceiver directly from the correlation of the inter-element complex product information from said single sensor station and the collateral information; and an output indicative of the probable position of the mobile transceiver.

2. A method for locating a mobile radio communications transceiver operating in an environment served by a cellular communications system comprising the steps of:

(1) measuring at least one integrated complex inter-element product of the signal representations of the radio signals received from the mobile radio transceiver by at least a single sensor station with a multiple-element antenna and signal receivers;

(2) accessing collateral information including a database of position-dependent, propagation-affected, complex products measured from the operating environment of the mobile transceiver;

(3) correlating a probable position of the mobile transceiver directly from the inter-element complex product information from said single sensor station and said collateral information; and (4) indicating a probable position of the mobile transceiver.

3. An apparatus for locating a mobile radio communications transceiver in an operating environment served by a wireless communications system, comprising:

at least a single sensor station having a multi-element antenna and signal receivers to receive radio signals from the mobile transceiver;

a signal characterization processing unit for measuring at least one integrated complex inter-element product of the received signal correlation coefficients obtained from the correlation reception of the signal representations of the radio signals received from the mobile radio transceiver by said single sensor station;

a source of collateral information including a database of position-dependent, propagation-affected, complex products measured from the operating environment of the mobile transceiver;

a multidimensional parametric correlation processing unit for determining a probable position of the mobile transceiver directly from the correlation of the inter-element complex product information from said single sensor station and the collateral information; and an output indicative of the probable position of the mobile transceiver.

4. A method for locating a mobile radio communications transceiver operating in an environment served by a cellular communications system, comprising the steps of:

(1) measuring at least one integrated complex inter-element product of the signal correlation coefficients obtained from the correlation reception of the signal representations of the radio signals received from the mobile radio transceiver by at least a single sensor station with a multiple-element antenna and signal receivers;

(2) accessing collateral information including a database of position-dependent, propagation-affected, complex products measured from the operating environment of the mobile transceiver;

(3) correlating a probable position of the mobile transceiver directly from the inter-element complex product information from said single sensor station and said collateral information; and (4) indicating a probable position of the mobile transceiver.

* * * * *

UNITED STATES PATENT AND TRADEMARK OFFICE
CERTIFICATE OF CORRECTION

PATENT NO.   : 6,127,975
DATED        : October 3, 2000
INVENTOR(S)  : John E. Maloney It is certified that error appears in the above-identified patent and that said Letters Patent is hereby corrected as shown below:

Title page,
Delete the title page and substitute the title page as shown on the attached page.

Drawings,
Delete Sheet 2 of 9 and replace with attached Sheet 2 of 9;
Delete Sheet 3 of 9 and replace with attached Sheet 3 of 9;

Column 20,
Line 21, delete "ti"

Signed and Sealed this

Twenty-sixth Day of November, 2002

Attest:

JAMES E. ROGAN
Attesting Officer   Director of the United States Patent and Trademark Office

United States Patent [19]
Maloney

[11] Patent Number: 6,127,975
[45] Date of Patent: Oct. 3, 2000

[54] SINGLE STATION COMMUNICATIONS LOCALIZATION SYSTEM

[75] Inventor: John E. Maloney, Springfield, Va.

[73] Assignee: KSI, Incorporated, Annandale, Va.

[21] Appl. No.: 09/031,057

[22] Filed: Feb. 26, 1998

Related U.S. Application Data

[63] Continuation of application No. 08/335,331, Nov. 3, 1994, Pat. No. 5,959,580.

[51] Int. Cl.[7] ....................................................... G01S 3/02
[52] U.S. Cl. ............................................ 342/457; 701/207
[58] Field of Search ................................... 342/417, 457, 342/357.01, 357.06; 701/207, 213, 220

[56] References Cited

U.S. PATENT DOCUMENTS

| | | |
|---|---|---|
| 4,728,959 | 3/1988 | Maloney et al. . |
| 5,003,317 | 3/1991 | Gray et al. ................................. 342/457 |
| 5,045,860 | 9/1991 | Hodson .................................... 342/451 |
| 5,465,289 | 11/1995 | Kennedy ..................................... 379/59 |
| 5,959,580 | 9/1999 | Maloney et al. ........................ 342/457 |

FOREIGN PATENT DOCUMENTS 9714257  4/1997  WIPO .

Primary Examiner—Thomas H. Tarcza
Assistant Examiner—Dao L. Phan
Attorney, Agent, or Firm—Sterne, Kessler, Goldstein & Fox P.L.L.C

[57] ABSTRACT

The present invention combines the measured characteristics of a radio signal in a communications environment with collateral information to produce an accurate and economical way to locate a mobile transmitter station, such as a mobile telephone, in a cellular telephone network.

4 Claims, 9 Drawing Sheets